US012732446B2

(12) United States Patent
Sawabe et al.

(10) Patent No.: US 12,732,446 B2
(45) Date of Patent: Sep. 8, 2026

(54) TERMINAL, ANALYSIS METHOD, AND ANALYSIS SYSTEM

(71) Applicant: NEC Corporation, Tokyo (JP)

(72) Inventors: Anan Sawabe, Tokyo (JP); Shinya Yasuda, Tokyo (JP); Takanori Iwai, Tokyo (JP); Yusuke Shinohara, Tokyo (JP)

(73) Assignee: NEC CORPORATION, Tokyo (JP)

(*) Notice: Subject to any disclaimer, the term of this patent is extended or adjusted under 35 U.S.C. 154(b) by 377 days.

(21) Appl. No.: 18/285,706

(22) PCT Filed: Apr. 14, 2021

(86) PCT No.: PCT/JP2021/015377
§ 371 (c)(1),
(2) Date: Oct. 5, 2023

(87) PCT Pub. No.: WO2022/219730
PCT Pub. Date: Oct. 20, 2022

(65) Prior Publication Data
US 2024/0372794 A1 Nov. 7, 2024

(51) Int. Cl.
*H04L 43/0852* (2022.01)
*H04L 43/026* (2022.01)

(52) U.S. Cl.
CPC ........ *H04L 43/0852* (2013.01); *H04L 43/026* (2013.01)

(58) Field of Classification Search
CPC .. H04L 43/0852; H04L 43/026; H04L 43/087
See application file for complete search history.

(56) References Cited

U.S. PATENT DOCUMENTS

| | | | | |
|---|---|---|---|---|
| 12,301,436 | B2 * | 5/2025 | Mochida | H04L 65/65 |
| 2010/0165864 | A1 | 7/2010 | Yamaguchi et al. | |
| 2016/0301571 | A1 * | 10/2016 | Wang | H04L 45/50 |
| 2017/0142610 | A1 * | 5/2017 | Nihei | H04W 28/0236 |
| 2017/0324635 | A1 * | 11/2017 | Oshiba | H04L 47/56 |
| 2017/0353360 | A1 * | 12/2017 | Hayashitani | H04L 41/04 |
| 2018/0351839 | A1 * | 12/2018 | Shirasuka | H04L 43/16 |
| 2019/0215231 | A1 * | 7/2019 | Yamane | H04L 43/0852 |
| 2021/0021502 | A1 | 1/2021 | Okada et al. | |

(Continued)

FOREIGN PATENT DOCUMENTS

| | | | |
|---|---|---|---|
| JP | 2006-060579 | A | 3/2006 |
| JP | 2010-154201 | A | 7/2010 |
| JP | 2012-182747 | A | 9/2012 |

(Continued)

OTHER PUBLICATIONS

Japanese Office Action for JP Application No. 2023-514233 mailed on Aug. 20, 2024 with English Translation.

(Continued)

*Primary Examiner* — Schquita D Goodwin

(57) ABSTRACT

A terminal (400-N) according to the present disclosure includes an acquisition unit (401) configured to acquire a reception interval of a plurality of packets received via a communication path; and a specifying (402) unit configured to specify a delay characteristic of a delay occurring in the communication path based on the distribution of the reception intervals.

17 Claims, 32 Drawing Sheets

(56) References Cited

U.S. PATENT DOCUMENTS

| | | | | |
|---|---|---|---|---|
| 2021/0359923 | A1* | 11/2021 | Koyama | H04L 43/0888 |
| 2022/0278922 | A1* | 9/2022 | Kolar | H04L 43/0894 |

FOREIGN PATENT DOCUMENTS

| | | | | | |
|---|---|---|---|---|---|
| JP | 2013-042435 | A | | 2/2013 | |
| JP | 2015-076780 | A | | 4/2015 | |
| JP | 2021-016133 | A | | 2/2021 | |
| WO | 2006/070471 | A1 | | 7/2006 | |
| WO | WO-2019233465 | A1 | * | 12/2019 | H04L 43/10 |

OTHER PUBLICATIONS

International Search Report for PCT Application No. PCT/JP2021/015377, mailed on Jun. 29, 2021.

* cited by examiner 1
100
TRANSMISSION TERMINAL
101
PACKET TRANSMITTING UNIT
200
RECEPTION TERMINAL
201
PACKET RECEIVING UNIT
202
RECEPTION INTERVAL CALCULATION UNIT
203
CLUSTERING UNIT
204
PROCESSING CONTENT IDENTIFYING UNIT
205
DELAY PROCESSING DB OBSERVATION DATA
Const Sched
DIVIDE INTO TWO
δ
kδ
CLUSTER CENTER c0 BEFORE DIVISION
CLUSTER CENTER CANDIDATES c1, c2
ERROR
S101
Prob Sched
DIVIDE INTO THREE
+δ
-δ
CLUSTER CENTER c0 BEFORE DIVISION
CLUSTER CENTER CANDIDATES c1, c2, c3
ERROR
S102
S103
ADOPT SCHEDULER WITH SMALLER ERROR
S104
REPEAT SIMILAR PROCESS FOR EACH CLUSTER CENTER

| PROCESSING CONTENT | TYPE | DELAY AMOUNT |
| --- | --- | --- |
| HARQ | ProbSched | 8ms |
| ACCESS PROCESSING | ConstSched | 20ms |
| . . . | . . . | . . . |

2071

CLUSTER OF PACKET i+1

| CLUSTER OF PACKET i | | C0 | C1 | C2 | C3 |
|---|---|---|---|---|---|
| | C0 | 0. 11765 | 0. 17647 | 0. 70588 | 0 |
| | C1 | 0 | 0. 01146 | 0. 98824 | 0. 00031 |
| | C2 | 0. 00184 | 0. 53265 | 0. 46501 | 0. 0005 |
| | C3 | 1 | 0 | 0 | 0 |

| | C0 | C1-0 | C1-1 | C1-2 | C2-0 | C2-1 | C2-2 | C3 |
|---|---|---|---|---|---|---|---|---|
| C0 | 0.11765 | 0.05882 | 0.11765 | 0 | 0.11765 | 0.29412 | 0.29412 | 0 |
| C1-0 | 0 | 0 | 0.00521 | 0 | 0.01042 | 0.80469 | 0.17969 | 0 |
| C1-1 | 0 | 0.0004 | 0.00641 | 0.0016 | 0.03364 | 0.82859 | 0.12895 | 0.0004 |
| C1-2 | 0 | 0.00573 | 0.02865 | 0.00573 | 0.72206 | 0.22636 | 0.01146 | 0 |
| C2-0 | 0 | 0.0044 | 0.42082 | 0.12757 | 0.00733 | 0.34164 | 0.09824 | 0 |
| C2-1 | 0 | 0.01599 | 0.45905 | 0.05519 | 0.01643 | 0.39422 | 0.05848 | 0.00066 |
| C2-2 | 0.01488 | 0.41001 | 0.11367 | 0.00541 | 0.35183 | 0.09743 | 0.00677 | 0 |
| C3 | 1 | 0 | 0 | 0 | 0 | 0 | 0 | 0 |

| | C0 | C1-0-0 | C1-0-1 | C1-0-2 | C1-1-0 | … | C2-1-2 | C2-2-0 | C2-2-1 | C2-2-2 | C3 |
|---|---|---|---|---|---|---|---|---|---|---|---|
| C0 | 0.11765 | | 0.05882 | 0 | 0.05882 | … | 0 | 0.29412 | 0 | 0 | 0 |
| C1-0-0 | 0 | 0 | 0 | 0 | 0 | … | 0.29167 | 0.20833 | 0.08333 | 0 | 0 |
| C1-0-1 | 0 | 0 | 0 | 0 | 0 | … | 0.41584 | 0.10891 | 0.0396 | 0.0396 | 0 |
| C1-0-2 | 0 | 0 | 0 | 0 | 0 | … | 0.20849 | 0.13127 | 0.02317 | 0.01158 | 0 |
| C1-1-0 | 0 | 0 | 0 | 0 | 0.00146 | … | 0.33285 | 0.08029 | 0.03212 | 0.01022 | 0 |
| … | … | … | … | … | … | … | … | … | … | … | … |
| C2-1-2 | 0 | 0.00166 | 0.0058 | 0.00829 | 0.26451 | … | 0.04229 | 0.06385 | 0.00415 | 0.00249 | 0.00083 |
| C2-2-0 | 0 | 0.01294 | 0.09612 | 0.31054 | 0.02588 | … | 0.03327 | 0.00555 | 0 | 0.00185 | 0 |
| C2-2-1 | 0 | 0.02649 | 0.17219 | 0.21192 | 0.05298 | … | 0.00662 | 0.00662 | 0 | 0 | 0 |
| C2-2-2 | 0.23404 | 0.14894 | 0.04255 | 0.10638 | 0.04255 | … | 0 | 0 | 0 | 0 | 0 |
| C3 | 1 | 0 | 0 | 0 | 0 | … | 0 | 0 | 0 | 0 | 0 |

Fig. 15

2051
LEARNING DEVICE
out:MIXED PROBABILITY OF EACH PROCESSING CONTENT
PROCESSING TYPE/ DELAY AMOUNT
STATE TRANSITION PROBABILITY
205
DELAY PROCESSING DB
INQUIRY
RESPONSE
2073
STATE TRANSITION PROBABILITY
ConstSched 20ms
ProbSched 8ms
ProbSched 1ms
PROCESSING CONTENT CANDIDATE LIST
· PROCESSES A + B + C 1B
100
TRANSMISSION TERMINAL
101
PACKET TRANSMITTING UNIT
200
RECEPTION TERMINAL
201
PACKET RECEIVING UNIT
202
RECEPTION INTERVAL CALCULATION UNIT
206
RECEPTION INTERVAL DB
208
DELAY PROCESSING MIXTURE DETERMINATION UNIT
203
CLUSTERING UNIT
204
PROCESSING CONTENT IDENTIFYING UNIT
205
DELAY PROCESSING DB 1C
100
TRANSMISSION TERMINAL
101
PACKET TRANSMITTING UNIT
200
RECEPTION TERMINAL
201
PACKET RECEIVING UNIT
202
RECEPTION INTERVAL CALCULATION UNIT
203
CLUSTERING UNIT
204
PROCESSING CONTENT IDENTIFYING UNIT
205
DELAY PROCESSING DB
209
DISPLAY UNIT

| PATH NAME | DELAY CHARACTERISTIC |
|---|---|
| COMMUNICATION PATH A | FIXED 3ms<br>PROBABILITY 7% 5ms |

Fig. 22

| PATH NAME | DELAY CHARACTERISTIC |
|---|---|
| COMMUNICATION PATH A | FIXED SHORT<br>PROBABILITY LOW |

Fig. 23

| FIXED | PROBABILITY |
|---|---|
| 1~5ms : SHORT | 1 TO 10 ms AT 1 TO 15%: (RISK) LOW |
| 6~10ms : MEDIUM | 20 TO 30 ms AT 15 TO 50%: (RISK) MEDIUM |
| 10~15ms : LONG | GREATER THAN OR EQUAL TO 30 ms AT 50% OR HIGHER: (RISK) HIGH |

Fig. 24

| PATH NAME | DELAY CHARACTERISTIC | DELAY PROCESSING CONTENT |
|---|---|---|
| COMMUNICATION PATH A | FIXED 7ms,<br>PROBABILITY 7% 5ms | ACCESS PROCESSING,<br>ERROR CORRECTION |

Fig. 25

1D
100
TRANSMISSION TERMINAL
103
DISPLAY UNIT
102
ANALYSIS RESULT RECEIVING UNIT
101
PACKET TRANSMITTING UNIT
200
RECEPTION TERMINAL
210
ANALYSIS RESULT TRANSMITTING UNIT
204
PROCESSING CONTENT IDENTIFYING UNIT
205
DELAY PROCESSING DB
203
CLUSTERING UNIT
201
PACKET RECEIVING UNIT
202
RECEPTION INTERVAL CALCULATION UNIT 1E
100
TRANSMISSION TERMINAL
101
PACKET TRANSMITTING UNIT
200
RECEPTION TERMINAL
201
PACKET RECEIVING UNIT
202
RECEPTION INTERVAL CALCULATION UNIT
203
CLUSTERING UNIT
204
PROCESSING CONTENT IDENTIFYING UNIT
205
DELAY PROCESSING DB
209
DISPLAY UNIT
211
APPLICATION CONTROL UNIT
212
APPLICATION DB

| APPLICATION NAME | COMMUNICATION CYCLE | ALLOWED DELAY |
|---|---|---|
| APPLICATION X | 10ms | FIXED 3ms, PROBABILITY 10% 5ms |
| APPLICATION Y | 1s | FIXED 7ms, PROBABILITY 5% 2ms |

Fig. 28

| PATH NAME | DELAY CHARACTERISTIC |
|---|---|
| COMMUNICATION PATH a | FIXED 7ms, PROBABILITY 5% 2ms |
| COMMUNICATION PATH b | FIXED 8ms, PROBABILITY 5% 3ms |
| COMMUNICATION PATH c | FIXED 10ms, PROBABILITY 5% 15ms |

| PATH NAME | DELAY CHARACTERISTIC |
|---|---|
| COMMUNICATION PATH a | FIXED SHORT, PROBABILITY LOW |
| COMMUNICATION PATH b | FIXED LONG, PROBABILITY LOW |
| COMMUNICATION PATH c | FIXED SHORT, PROBABILITY HIGH |

| TERMINAL NAME | PRIORITY | ALLOWED DELAY |
| --- | --- | --- |
| TERMINAL A | 2 | FIXED 7ms, PROBABILITY 5% 2ms |
| TERMINAL B | 1 | FIXED 7ms, PROBABILITY 5% 2ms |
| TERMINAL C | 3 | FIXED 10ms, PROBABILITY 5% 15ms |

| PATH NAME | DELAY CHARACTERISTIC |
| --- | --- |
| COMMUNICATION PATH a | FIXED 7ms, PROBABILITY 5% 2ms |
| COMMUNICATION PATH b | FIXED 8ms, PROBABILITY 5% 3ms |
| COMMUNICATION PATH c | FIXED 10ms, PROBABILITY 5% 15ms |

Fig. 33

| PATH NAME | DELAY CHARACTERISTIC | DELAY PROCESSING CONTENT |
|---|---|---|
| COMMUNICATION PATH a | FIXED 7ms, PROBABILITY 5% 2ms | ACCESS PROCESSING |
| COMMUNICATION PATH b | FIXED 8ms, PROBABILITY 5% 3ms | (NONE) |
| COMMUNICATION PATH c | FIXED 10ms, PROBABILITY 5% 15ms | ERROR CORRECTION |

Fig. 35

| TYPE | PRIORITY | ALLOWED DELAY |
|---|---|---|
| EMERGENCY VEHICLE | 1 | FIXED 7ms, PROBABILITY 5% 2ms |
| AUTOMATIC DRIVING VEHICLE | 2 | FIXED 4ms, PROBABILITY 5% 2ms |
| GENERAL VEHICLE | 3 | FIXED 10ms, PROBABILITY 5% 15ms |

Fig. 36

TERMINAL, ANALYSIS METHOD, AND ANALYSIS SYSTEM

TECHNICAL FIELD

The present disclosure relates to a terminal, an analysis method, and an analysis system.

BACKGROUND ART

In recent years, there is an increasing need to use delay-sensitive applications. Examples of delay-sensitive applications include applications used for automated guided vehicles (AGVs), automatic driving, remote control of robots, and the like.

On the other hand, with development and commercialization of wireless communication technologies, communication paths selectable by users are diversified. Examples of the communication path selectable by the user include wireless networks such as a commercial network (e.g., mobile network operator (MNO) and mobile virtual network operator (MVNO) such as, for example, 4th generation (4G)/long term evolution (LTE) and 5G) and a self-managed network (e.g., private long term evolution (LTE) or local 5G).

However, the communication characteristics vary depending on the communication path. Therefore, it is considered that the carrier and the user dish to easily grasp the communication characteristics of the communication path.

Examples of a method of measuring a communication characteristic of a communication path include a method of measuring a delay time related to network processing (e.g., Patent Literatures 1 and 2).

According to the method described in Patent Literature 1, the time when the packet passes through the start position and the end position of a predetermined section in the system are recorded, and the delay time in the predetermined section is calculated by comparing the time of the start position and the time of the end position.

In addition, according to the method described in Patent Literature 2, a plurality of first delay times generated in packet reciprocation between a firewall (FW) device and a first communication device, and a plurality of second delay times generated in packet reciprocation between the FW device and a second communication device are acquired. Then, the first delay time and the second delay time are respectively sorted, and a difference between the first delay time and the second delay time in the order in which the order after sorting is the same is obtained, thereby calculating the delay time generated in the FW device. Then, when the calculated delay time is greater than or equal to the threshold value, the FW device is determined to be in an overload state.

CITATION LIST

Patent Literature

Patent Literature 1: Japanese Unexamined Patent Application Publication No. 2015-076780

Patent Literature 2: Japanese Unexamined Patent Application Publication No. 2021-016133

SUMMARY OF INVENTION

Technical Problem

However, both methods described in patent documents 1 and 2 described above measure the delay time that occurred as a result, and do not grasp the delay characteristics of the delay. Thus, the carrier and the user have requests to check the delay property of the delay generated in the communication bus, It is an object of the present disclosure to provide a terminal, an analysis method, and an analysis system capable of checking the delay generated in the communication path.

Solution to Problem

A terminal according to one aspect including:
- an acquisition unit configured to acquire a reception interval of a plurality of packets received via a communication path; and
- a specifying unit configured to specify a delay characteristic of a delay occurring in the communication path based on the distribution of the reception intervals.

An analysis method according to one aspect including the steps of:
- receiving a plurality of packets via a communication path;
- acquiring a reception interval of the plurality of received packets; and
- specifying a delay characteristic of a delay occurring in the communication path based on the distribution of the reception intervals.

An analysis system according to one aspect including:
- a receiving means for receiving a plurality of packets via a communication path;
- an acquisition means for acquiring a reception interval of the plurality of received packets; and
- a specifying means for specifying a delay characteristic of a delay occurring in the communication path based on the distribution of the reception intervals.

Advantageous Effects of Invention

According to the aspects described above, an effect in that a terminal, an analysis method, and an analysis system capable of confirming a delay characteristic of a delay occurring in a communication path can be provided is obtained.

BRIEF DESCRIPTION OF DRAWINGS

FIG. 13 is a diagram illustrating an example of a state transition probability calculated by a state transition probability calculation unit according to the second example embodiment.

FIG. 14 is a diagram illustrating an example of the state transition probability calculated by the state transition probability calculation unit according to the second example embodiment.

FIG. 15 is a diagram illustrating an example of the state transition probability calculated by the state transition probability calculation unit according to the second example embodiment.

FIG. 22 is a diagram illustrating a display example of a delay characteristic of a communication path displayed by a display unit according to the fourth example embodiment.

FIG. 23 is a diagram illustrating a display example of the delay characteristic of the communication path displayed by the display unit according to the fourth example embodiment.

FIG. 24 is a diagram illustrating an example of a table used for classification by levels of the delay characteristics of the communication path in a display unit according to the fourth example embodiment.

FIG. 25 is a diagram illustrating a display example of a delay characteristic and processing content of the delay processing of a communication path displayed by a display unit according to the fourth example embodiment.

FIG. 28 is a diagram illustrating an example of information stored in an application DB according to the sixth example embodiment.

FIG. 33 is a diagram illustrating an example in which a communication path is selected according to priority of a terminal in an analysis system according to another example embodiment.

FIG. 35 is a diagram illustrating an example of a delay characteristic and processing content of delay processing of each communication path in the analysis system illustrated in FIG. 34.

FIG. 36 is a diagram illustrating an example of a priority of vehicle type in the analysis system illustrated in FIG. 34.

EXAMPLE EMBODIMENT

Example embodiments of the present disclosure are described below with reference to the drawings. Note that in the description and drawings described below, omission and simplification are made as appropriate, for clarity of description. Furthermore, in each of the drawings described below, the same elements are denoted by the same reference signs, and a duplicate description is omitted as necessary. In addition, specific numerical values and the like shown below are only examples to facilitate understanding of the present disclosure, and are not limited thereto.

First Example Embodiment

First, a configuration example of an analysis system 1 according to the first example embodiment will be described with reference to FIG. 1.

Figure 1:
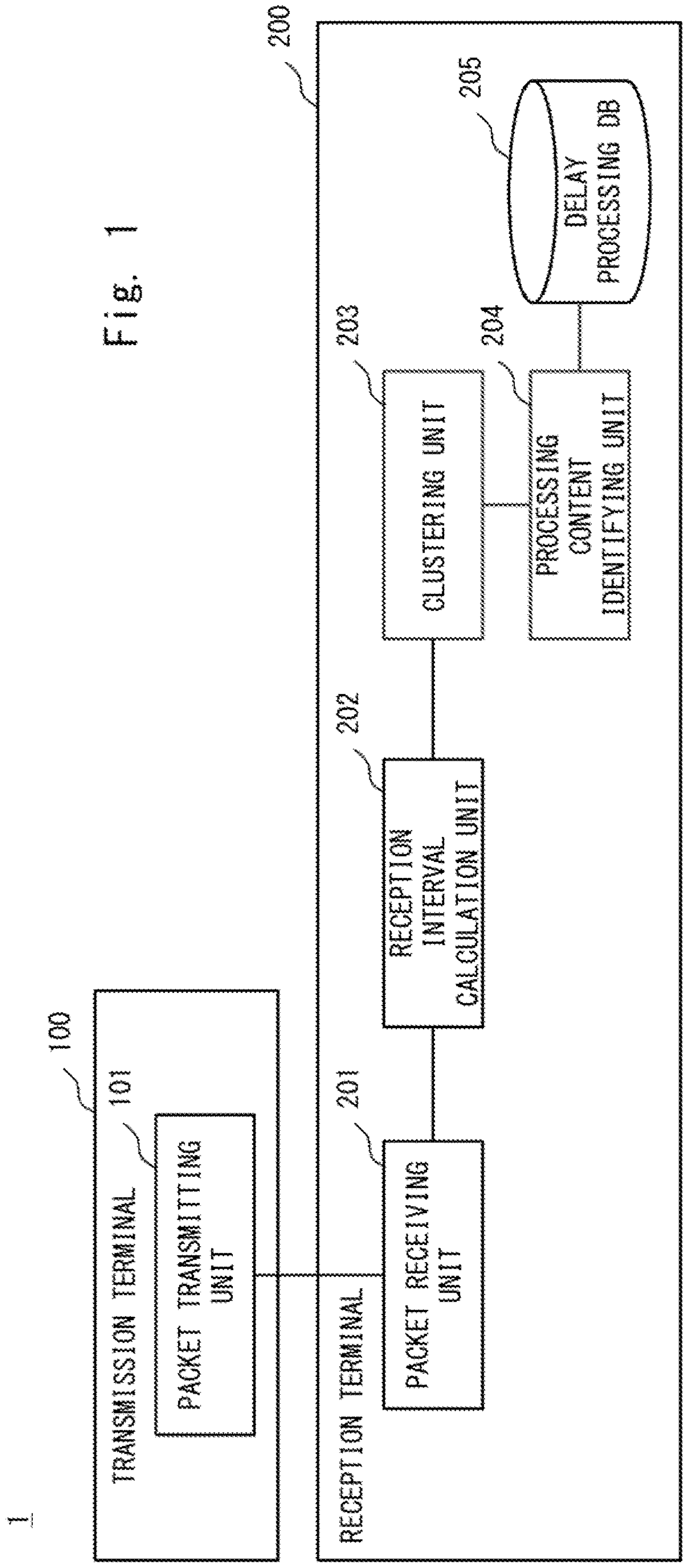
FIG. 1 is a block diagram illustrating a configuration example of an analysis system according to a first example embodiment.

As illustrated in FIG. 1, the analysis system 1 according to the first example embodiment includes a transmission terminal 100 and a reception terminal 200.

The transmission terminal 100 includes a packet transmitting unit 101.

The packet transmitting unit 101 transmits packets of a fixed size to the reception terminal 200 at regular intervals via the communication path. The communication path is a wireless network such as a commercial network such as 4G/LTE or 5G provided by the MNO, the MVNO, or the like, or a self-managed network such as private LTE, local 5G, or wireless fidelity (Wi-Fi).

The reception terminal 200 includes a packet receiving unit 201, a reception interval calculation unit 202, a clustering unit 203, a processing content identifying unit 204, and a delay processing database (DB) 205. However, the present invention is not limited thereto, and the reception interval calculation unit 202, the clustering unit 203, the processing content identifying unit 204, and the delay processing DB 205 may be provided on a device different from the reception terminal 200 or on a cloud. Furthermore, the delay processing DB 205 may be provided on a cloud and shared with a plurality of devices.

The packet receiving unit 201 receives a packet from the packet transmitting unit 101 of the transmission terminal 100 via the communication path.

Figure 2:
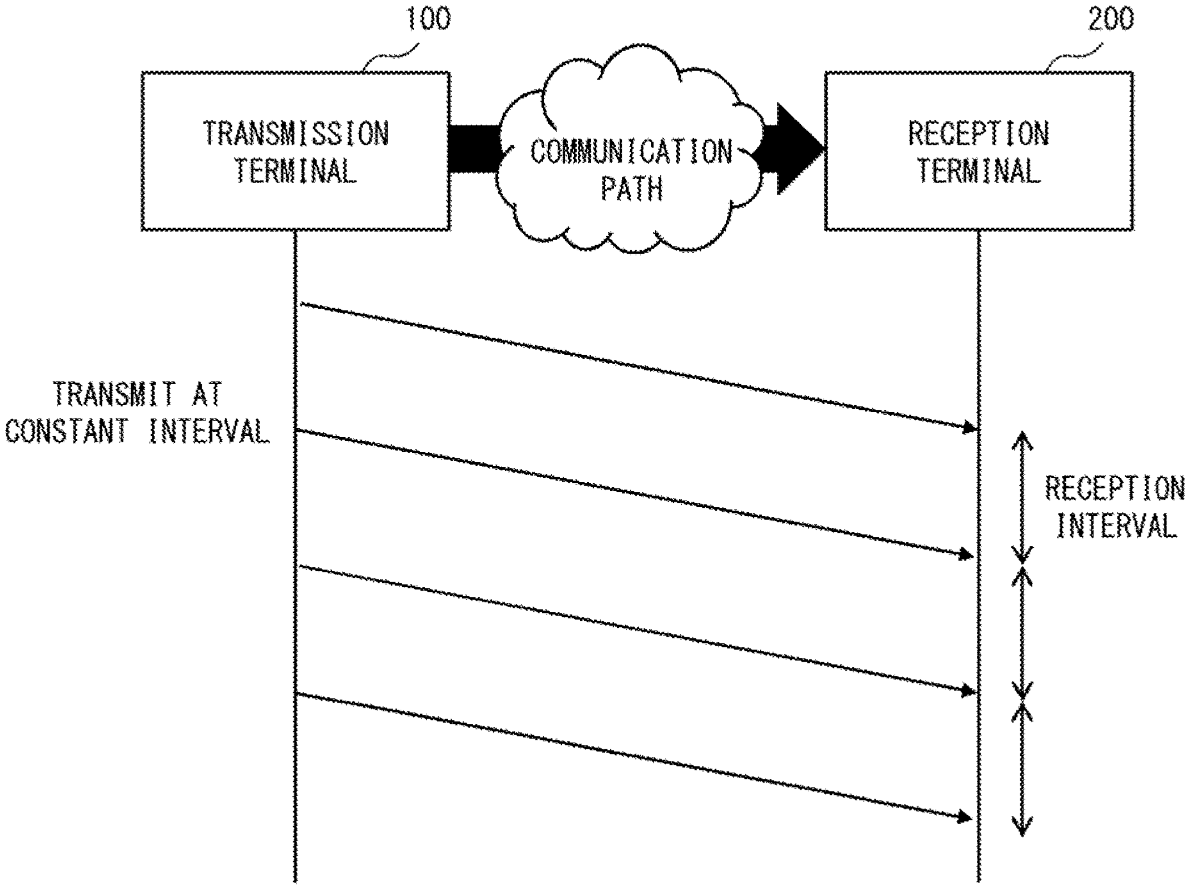
FIG. 2 is a diagram for describing a schematic operation example of a reception interval calculation unit according to the first example embodiment.

As illustrated in FIG. 2, the reception interval calculation unit 202 calculates the reception interval of the packets received by the packet receiving unit 201.

The clustering unit 203 analyzes a pattern on how the reception intervals of the packets fluctuate (hereinafter appropriately referred to as a "delay jitter") to specify a type and a delay amount of a delay processing of a scheduler interposed between the transmission terminal 100 and the reception terminal 200. In the following description, an example of analyzing the distribution of the delay jitter will be described as the pattern of the delay jitter.

Here, the delay jitter differs depending on whether or not a device (hereinafter, referred to as a "scheduler") that performs delay processing is interposed between the transmission terminal 100 and the reception terminal 200.

Figure 3:
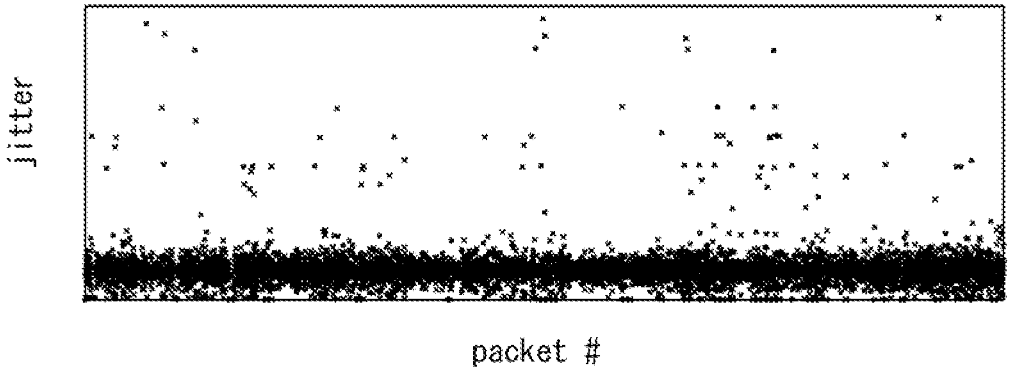
FIG. 3 is a diagram illustrating an example of a distribution of a delay jitter in a case where a scheduler is not interposed.
Figure 4:
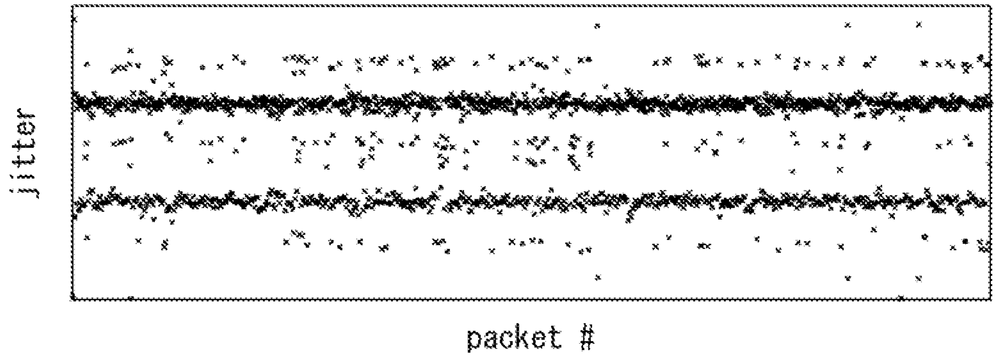
FIG. 4 is a diagram illustrating an example of a distribution of a delay jitter in a case where a scheduler is interposed.

FIG. 3 illustrates an example of the distribution of the delay jitter in a case where the scheduler is not interposed, and FIG. 4 illustrates an example of the distribution of the delay jitter in a case where the scheduler is interposed. In FIGS. 3 and 4, a horizontal axis indicates a packet number, and a vertical axis indicates delay jitter (reception interval) of a packet having the packet number. Here, the packet transmitting unit 101 of the transmission terminal 100 increases the packet number each time a packet is transmitted. Therefore, the packet having the largest packet number is the most recently received packet.

As illustrated in FIGS. 3 and 4, the distribution of the delay jitter (FIG. 4) in the case where the scheduler is interposed is characterized by a stripe pattern having a hierarchical property as compared with the distribution of the delay jitter (FIG. 3) in the case where the scheduler is not interposed.

In addition, the distribution of the delay jitter in the case where the scheduler is interposed also shows different characteristics depending on the type and the delay amount of the delay processing of the scheduler as described later.

The type of delay processing is classified according to a state of a delay generated with a scheduler interposed, and includes, for example, a process (Constant scheduler, hereinafter also referred to as ConstSched) that fixedly generates a delay and a process (Probability scheduler, hereinafter also referred to as ProbSched) that generates a probabilistic delay. The delay amount is a magnitude of a delay generated with the scheduler interposed therebetween. More specifically, the delay amount is a magnitude of a difference between the arrival time (or reception time) of consecutive packets generated with the scheduler interposed therebetween.

Here, with reference to FIGS. 5 and 6, the difference in the distribution of the delay jitter due to the type and the delay amount of the delay processing of the scheduler interposed between the transmission terminal 100 and the reception terminal 200 will be described.

Figure 5:
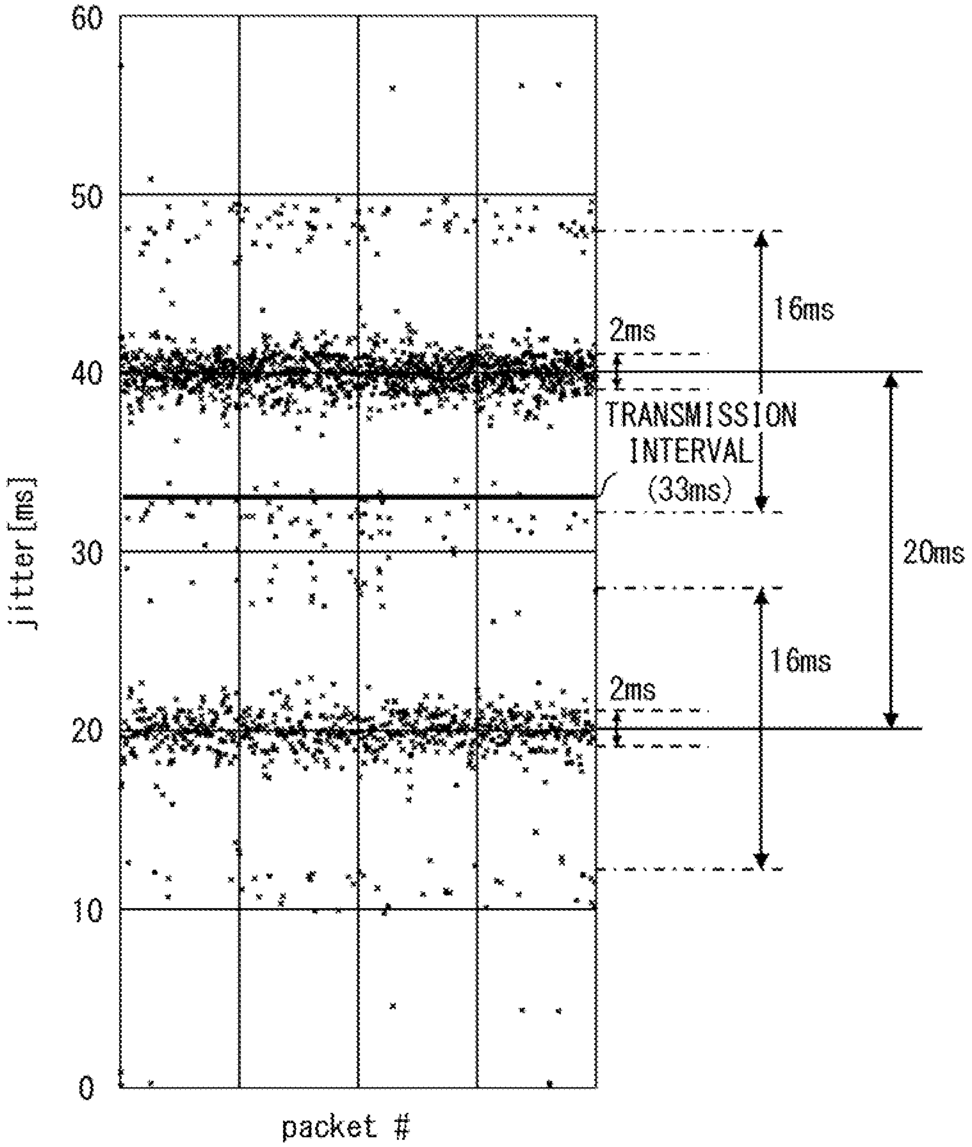
FIG. 5 is a diagram illustrating an example of a distribution of delay jitter in a case where a scheduler ConstSched, a scheduler ProbSched1, and a scheduler ProbSched2 are interposed between a transmission terminal and a reception terminal.
Figure 6:
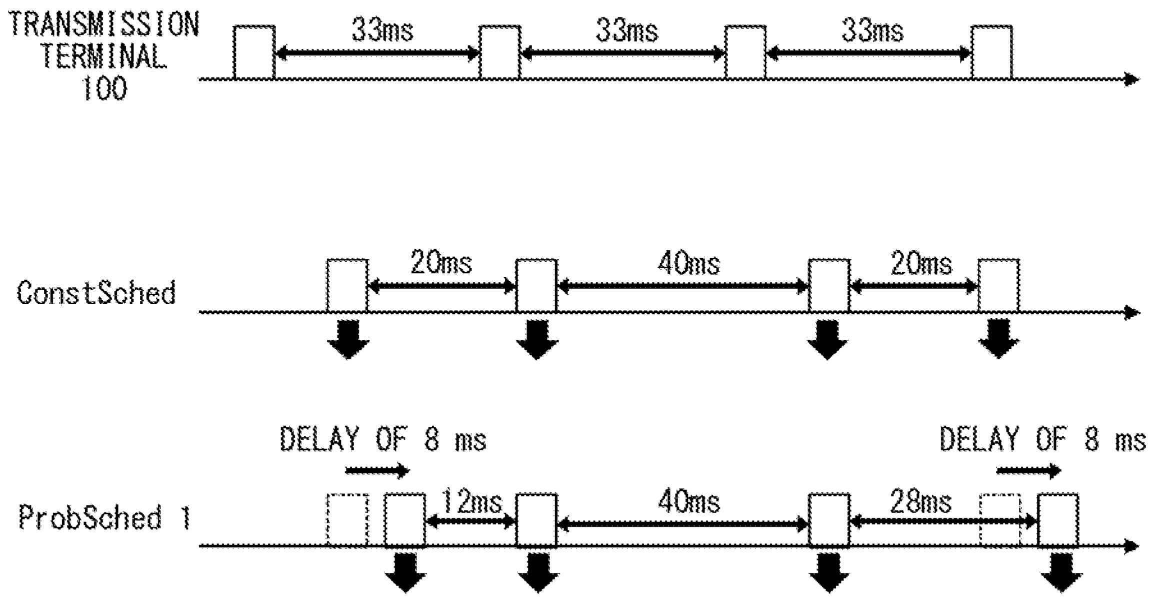
FIG. 6 is a diagram illustrating an example of a packet transmission timing in the transmission terminal, a packet transmission timing in the scheduler ConstSched, and a packet transmission timing in the scheduler ProbSched1 in the case of FIG. 5.

Note that, in FIGS. 5 and 6, the packet transmitting unit 101 transmits packets of 100 bytes at an interval of 33 ms.

In addition, in FIGS. 5 and 6, it is assumed that a scheduler ConstSched (constant scheduler), a scheduler ProbSched (probability scheduler) 1, and a scheduler ProbSched2 are interposed in this order between the transmission terminal 100 and the reception terminal 200.

That is, in FIGS. 5 and 6, the packet transmitted from the packet transmitting unit 101 passes through the scheduler ConstSched, the scheduler ProbSched1, and the scheduler ProbSched2 in this order, and then is received by the packet receiving unit 201. FIG. 5 illustrates an example of the distribution jitter of the delay jitter indicating how the packet received by the packet receiving unit 201 fluctuates.

Here, the scheduler ConstSched is a scheduler that transmits packets at intervals of 20 ms. On the other hand, the packet transmitting unit 101 provided in the preceding stage of the scheduler ConstSched transmits packets at intervals of 33 ms. Therefore, a fixed delay processing occurs in the scheduler ConstSched as described later.

On the other hand, the scheduler ProbSched1 is a scheduler in which processing of 8 ms occurs with a certain probability. In addition, the scheduler ProbSched2 is a scheduler in which processing of 1 ms occurs with a certain probability. Therefore, probabilistic delay processing occurs in the schedulers ProbSched1 and ProbSched2 as described later.

FIG. 6 illustrates examples of a packet transmission timing in the packet transmitting unit 101, a packet transmission timing in the scheduler ConstSched, and a packet transmission timing in the scheduler ProbSched1.

As illustrated in FIG. 6, the packet transmitting unit 101 transmits packets at intervals of 33 ms.

Therefore, packets are input to the scheduler ConstSched provided at the subsequent stage of the packet transmitting unit 101 at intervals of 33 ms.

However, the scheduler ConstSched transmits packets at intervals of 20 ms. Therefore, a situation in which no packet is input may occur in the scheduler ConstSched. In this situation, the scheduler ConstSched forgoes packet transmission. Thus, the scheduler ConstSched transmits packets at intervals of 20 ms or 40 ms.

Therefore, when the packet passes through the scheduler ConstSched, the distribution of the delay jitter is divided into two clusters so as to sandwich an interval at which the packet is input to the scheduler ConstSched.

Specifically, as illustrated in FIG. 5, the distribution of the delay jitter is divided into two clusters, a cluster having a cluster center at around 20 ms and a cluster having a cluster center at around 40 ms so as to sandwich an interval of 33 ms at which the packet is input.

Returning back to FIG. 6, packets are input to the scheduler ProbSched1 provided at the subsequent stage of the scheduler ConstSched at intervals of 20 ms or 40 ms.

However, in the scheduler ProbSched1, processing of 8 ms occurs with a certain probability, and as a result, transmission of a packet is delayed by 8 ms. Therefore, for example, when a previous packet of a certain packet is delayed, the interval between the packets is shortened by 8 ms, and when a next packet of the certain packet is delayed, the interval between the packets is lengthened by 8 ms. Therefore, the scheduler ProbSched1 transmits packets at intervals of 12 (=20−8) ms, 20 ms, 28 (=20+8) ms, 32 (=40−8) ms, 40 ms, or 48 (=40+8) ms. Note that in the example of FIG. 6, the scheduler ProbSched1 transmits packets at intervals of 12 ms, 40 ms, and 28 ms.

Therefore, when the packet passes through the scheduler ProbSched1, the distribution of the delay jitter is divided into three clusters, a cluster having a cluster center near an interval at which the packet is input to the scheduler ProbSched1, and a cluster having a cluster center above and below the interval.

Specifically, as illustrated in FIG. 5, near 20 ms, the distribution of the delay jitter is divided into three clusters, that is, a cluster having a cluster center near 20 ms, a cluster having a cluster center at 12 ms, and a cluster having a cluster center at 28 ms.

In addition, near 40 ms, the distribution of the delay jitter is divided into three clusters, that is, a cluster having a cluster center near 40 ms, a cluster having a cluster center at 32 ms, and a cluster having a cluster center at 48 ms.

Although not illustrated in FIG. 6, packets are input to the scheduler ProbSched2 provided at the subsequent stage of the scheduler ProbSched1 at intervals of 12 ms, 20 ms, 28 ms, 32 ms, 40 ms, or 48 ms.

Therefore, when the packet passes through the scheduler ProbSched2, the distribution of the delay jitter is divided into three clusters, a cluster having a cluster center near an interval at which the packet is input to the scheduler ProbSched2, and a cluster having a cluster center above and below the interval.

As described above, when the scheduler ConstSched in which a fixed delay processing occurs is interposed between the transmission terminal 100 and the reception terminal 200, the distribution of the delay jitter is divided into two. In addition, when the scheduler ProbSched in which probabilistic delay processing occurs is interposed between the transmission terminal 100 and the reception terminal 200, the distribution of the delay jitter is divided into three.

By using this, the clustering unit 203 performs hierarchical clustering on the distribution of the delay jitter, thereby estimating the type and the delay amount of the delay processing of the scheduler interposed between the transmission terminal 100 and the reception terminal 200.

Hereinafter, the operation of the clustering unit 203 will be described in detail.

First, a schematic operation example of the clustering unit 203 will be described with reference to FIG. 7.

Figure 7:
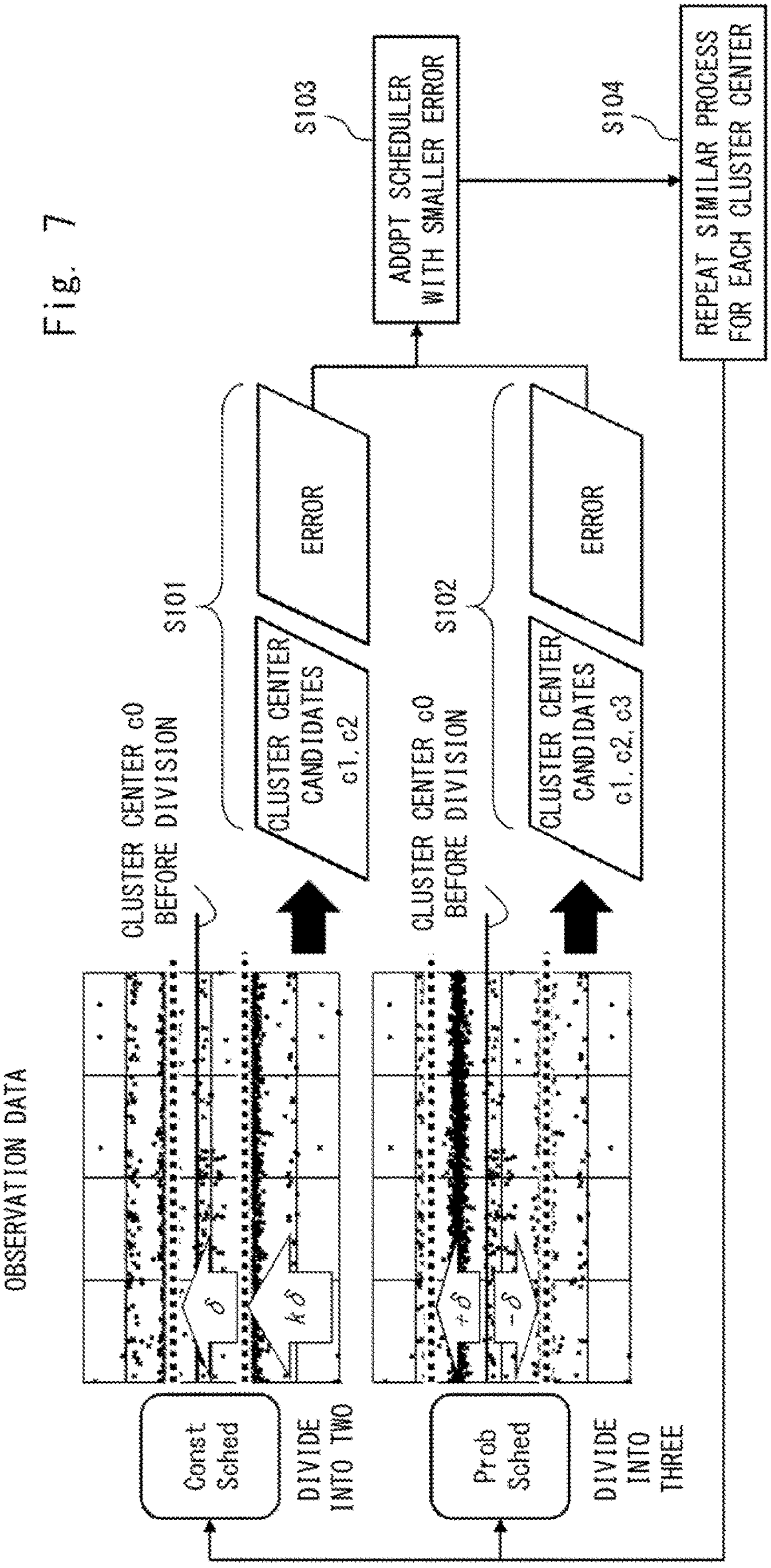
FIG. 7 is a diagram illustrating a schematic operation example of a clustering unit according to the first example embodiment.

Step S101:

As illustrated in FIG. 7, the clustering unit 203 performs clustering on the assumption that the scheduler ConstSched in which fixed delay processing occurs is interposed.

Specifically, the clustering unit 203 calculates a mean absolute error (MAE) by the following Equation 1 while changing the scheduler interval 6. Note that, for example, it is conceivable to determine 6 to be searched in advance and calculate MAE for all predetermined 6.

$$MAE(\delta) = \sum_{i=1}^{\substack{\text{Number of} \\ \text{observation data } (N)}} \frac{\left|\begin{array}{c} i\text{-}th \text{ observation value} - \\ \text{Most proximate cluster} \\ \text{center at time of } \delta \end{array}\right|}{N} \qquad \text{[Equation 1]}$$

In FIG. 7, k is a constant for sandwiching the cluster center c0 before division between kδ and (k+1) δ. By default, the cluster center c0 before division can be a packet transmission interval by the packet transmitting unit 101.

In addition, in Equation 1, the number of observation data (N) indicates the total number of packets, the i-th observation value indicates the delay jitter (reception interval) of the i-th packet, and the nearest neighbor cluster center indicates the cluster center from the i-th packet to the nearest cluster center among the cluster center candidates after the division. Here, the cluster center candidates after the division are kδ and (k+1) δ.

The clustering unit 203 adopts δ at which the MAE becomes the minimum value, and determines cluster center candidates c1 and c2 using the adopted δ. Here, the cluster center candidates c1 and c2 are kδ and (k+1) δ.

Step S102:

On the other hand, the clustering unit 203 performs clustering on the assumption that the scheduler ProbSched in which probabilistic delay processing occurs is interposed.

Specifically, the clustering unit 203 calculates the MAE by the above-described Equation 1 while changing the delay amount δ.

In Equation 1, the number of observation data (N), the i-th observation value, and the nearest neighbor cluster center are similar to the clustering according to the scheduler ConstSched. Here, the cluster center candidates after the division are the cluster center c before the division and the cluster center c±δ before the division.

The clustering unit 203 adopts 6 at which the MAE becomes the minimum value, and determines cluster center candidates c1, c2, and c3 using the adopted δ. Here, the cluster center candidates c1, c2, and c3 are the cluster center c−δ before the division, the cluster center c before the division, and the cluster center c+δ before the division.

Step S103:

Next, the clustering unit 203 compares the minimum value of MAE calculated by the clustering related to the scheduler ConstSched in step S101 with the minimum value of MAE calculated by the clustering related to the scheduler ProbSched in step S102, and adopts a scheduler having a smaller MAE of the scheduler ConstSched and the scheduler ProbSched.

Step S104:

Next, the clustering unit 203 newly sets, sequentially, the cluster center candidates of the scheduler adopted in step S103 as the cluster center c0 before division, and repeats steps S101 to S103 described above for the newly set cluster center before division.

Next, a flow example of a schematic operation of the clustering unit 203 will be described with reference to FIG. 8.

Figure 8:
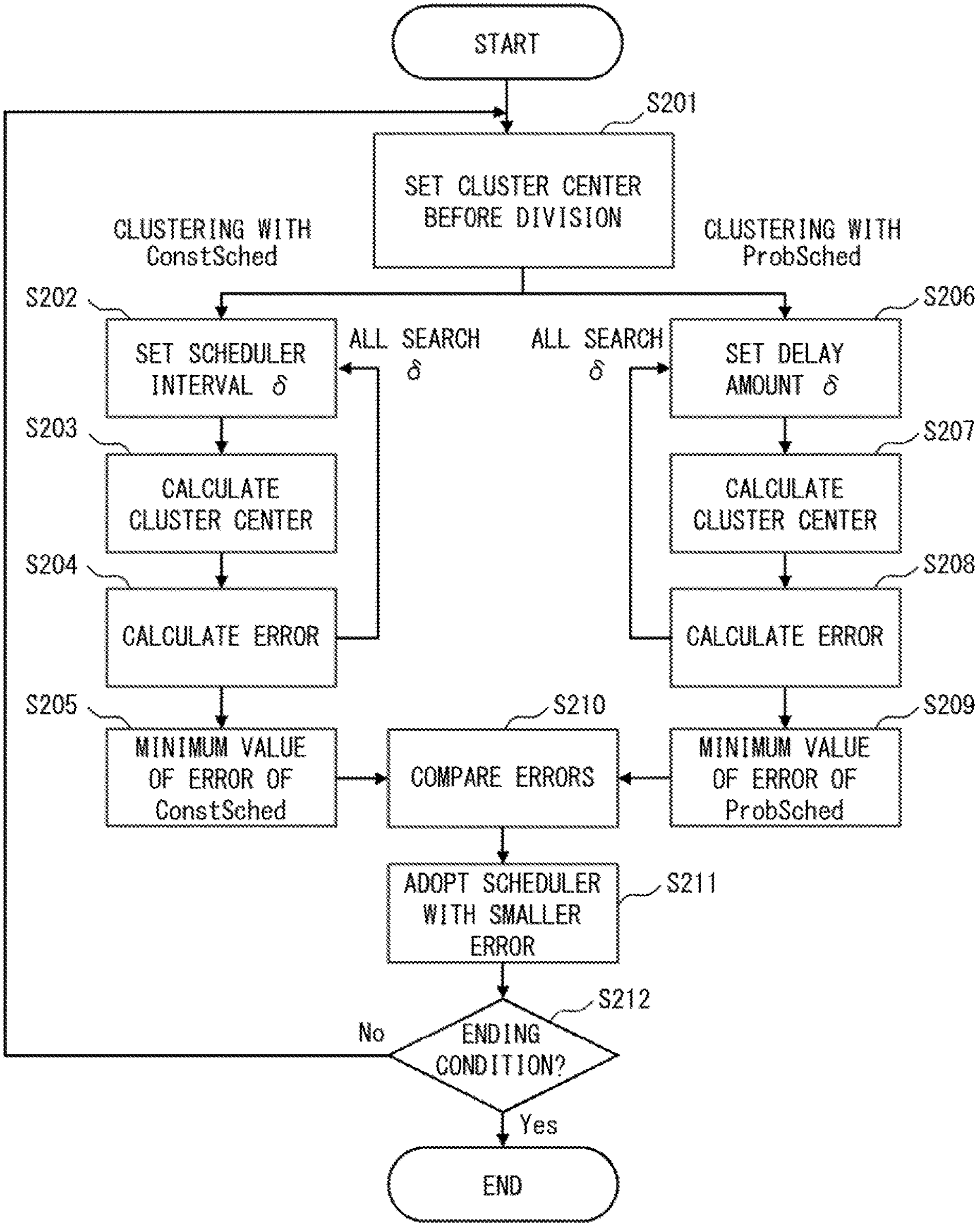
FIG. 8 is a flowchart illustrating a flow example of a schematic operation of the clustering unit according to the first example embodiment.

As illustrated in FIG. 8, first, the clustering unit 203 sets a cluster center before division (step S201). By default, the cluster center before division can be a packet transmission interval by the packet transmitting unit 101.

Next, the clustering unit 203 performs clustering on the assumption that the scheduler ConstSched in which fixed delay processing occurs is interposed.

Specifically, the clustering unit 203 sets the scheduler interval 6 (step S202), calculates a cluster center candidate using δ (step S203), and calculates MAE using the cluster center candidate (step S204). These steps S202 to S204 are performed for all predetermined δ.

Next, the clustering unit 203 adopts —6 at which the MAE becomes the minimum value (step S205). The clustering unit 203 uses the adopted δ, and determines the cluster center candidate.

On the other hand, the clustering unit 203 performs clustering on the assumption that the scheduler ProbSched in which probabilistic delay processing occurs is interposed.

Specifically, the clustering unit 203 sets the delay amount δ (step S206), calculates a cluster center candidate using δ (step S207), and calculates MAE using the cluster center candidate (step S208). These steps S206 to S208 are performed for all predetermined δ.

Next, the clustering unit 203 adopts δ at which the MAE becomes the minimum value (step S209). The clustering unit 203 uses the adopted δ, and determines the cluster center candidate.

Next, the clustering unit 203 compares the minimum value of MAE calculated by the clustering related to the scheduler ConstSched with the minimum value of MAE calculated by the clustering related to the scheduler ProbSched (step S210), and adopts a scheduler having a smaller MAE of the scheduler ConstSched and the scheduler ProbSched (step S211).

Next, the clustering unit 203 determines whether or not the ending condition is satisfied (step S212). The ending condition is a condition as to whether the difference between the cluster centers of the scheduler adopted in step S211 is less than a threshold value or the like.

When the ending condition is not satisfied in step S212 (No in step S212), the process returns to step S201, and the clustering unit 203 sequentially newly sets the cluster center candidate of the scheduler adopted in step S211 as the cluster center before the division, and repeats the subsequent processes on the newly set cluster center before the division.

On the other hand, in a case where the ending condition is satisfied in step S212 (Yes in step S212), the clustering unit 203 ends the process.

Next, an example of a result obtained in the process of the operation of the clustering unit 203 will be described with reference to FIG. 9.

Figure 9:
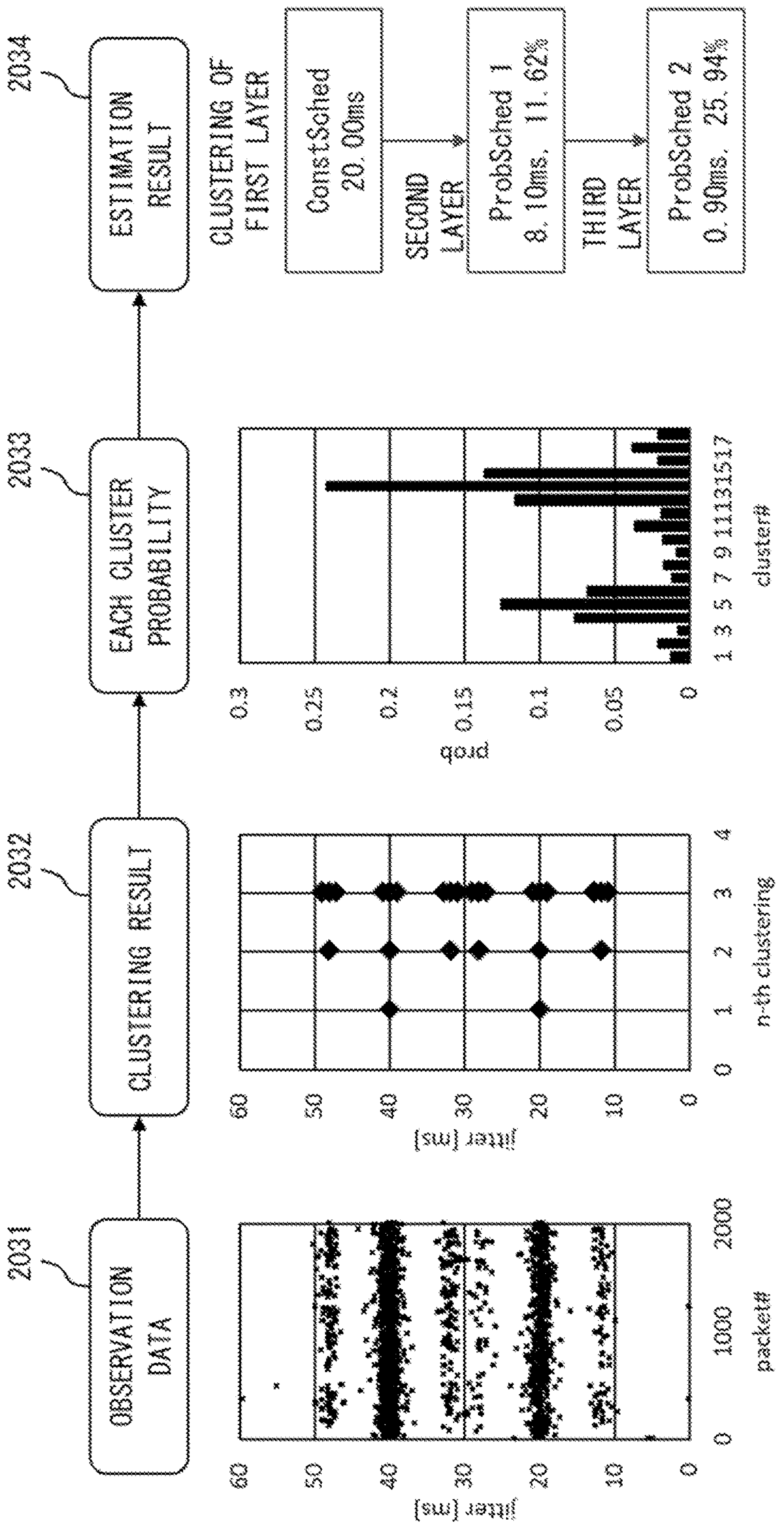
FIG. 9 is a diagram illustrating an example of a result obtained in the process of the operation of the clustering unit according to the first example embodiment.

As illustrated in FIG. 9, first, the clustering unit 203 performs hierarchical clustering on the observation data 2031 of the distribution of the delay jitter, and obtains a clustering result 2032.

Here, the horizontal axis and the vertical axis of the observation data 2031 of the distribution of the delay jitter are similar to those in FIGS. 3 and 4. In addition, the horizontal axis of the clustering result 2032 indicates which layer of clustering. In addition, the vertical axis of the clustering result 2032 indicates the cluster center of each cluster after division by the scheduler adopted in the clustering of each layer.

The clustering result 2032 shows the following.

In the clustering of the first layer, the scheduler ConstSched having a delay amount of 20 ms is adopted, and the distribution of the delay jitter is divided into two.

In the clustering of the second layer, the scheduler ProbSched1 having a delay amount of 8.1 ms is adopted, and the distribution of the delay jitter is divided into three.

In the clustering of the third layer, the scheduler ProbSched2 having a delay amount of 0.9 ms is adopted, and the distribution of the delay jitter is divided into three.

Next, the clustering unit 203 obtains each cluster probability 2033.

The horizontal axis of each cluster probability 2033 indicates the cluster number of each cluster after division by the scheduler ProbSched2 having the delay amount of 0.9 ms adopted in the clustering of the third layer. In the clustering result 2032, the cluster number of the lowermost cluster is one, and the cluster number increases toward the positive direction. The vertical axis of each cluster probability 2033 indicates a probability obtained by dividing the number of packets of the packets belonging to the cluster of the cluster number by the total number of packets.

Thereafter, the clustering unit 203 estimates the type (ConstSched or ProbSched) and the delay amount of the delay processing of the scheduler interposed between the transmission terminal 100 and the reception terminal 200 based on the clustering result 2032 and each cluster probability 2033, and obtains an estimation result 2034.

The estimation result 2034 shows the following.

In the clustering of the first layer, it is estimated that the scheduler ConstSched having a delay amount of 20 ms is interposed.

In the clustering of the second layer, it is estimated that the scheduler ProbSched1 having a delay amount of 8.1 ms is interposed and the probability of occurrence of processing with a delay amount of 8.1 ms is 11.62%. This probability is obtained by dividing the number of packets of the packets belonging to the cluster of 20 ms±8.1 ms and the cluster of 40 ms±8.1 ms by the total number of packets.

In the clustering of the third layer, it is estimated that the scheduler ProbSched2 having a delay amount of 0.9 ms is interposed and the probability of occurrence of processing with a delay amount of 0.9 ms is 25.94%. The probability may be obtained by a method complying with the clustering in the second layer.

As described above, it can be seen that the clustering unit 203 can estimate the type (ConstSched or ProbSched) and the delay amount of the delay processing of the scheduler interposed between the transmission terminal 100 and the reception terminal 200 from the observation data 2031 of the distribution of the delay jitter.

Figure 10:
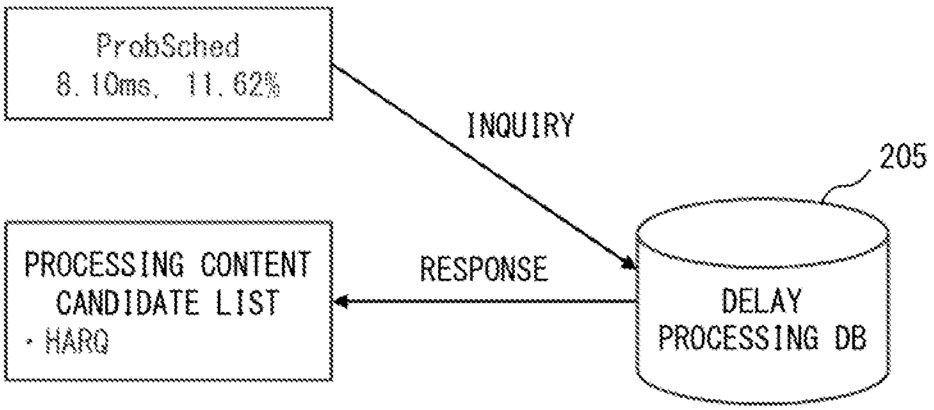
FIG. 10 is a diagram illustrating a schematic operation example of a processing content identifying unit and a delay processing DB according to the first example embodiment.

As illustrated in FIG. 10, the delay processing DB 205 is a database that stores information on a type and a delay amount of the delay processing for each processing content of the delay processing of the scheduler.

As illustrated in FIG. 10, the processing content identifying unit 204 inputs the type and the delay amount of the delay processing of the scheduler estimated by the clustering unit 203, and inquires the delay processing DB 205 about the specific processing content of the delay processing.

Then, the delay processing DB 205 returns specific processing content of the delay processing to the processing content identifying unit 204 as a response to the inquiry. In the example of FIG. 10, the processing content identifying unit 204 makes an inquiry in which the scheduler ProbSched1 having a delay amount of 8.1 ms is input, and the delay processing DB 205 returns hybrid automatic repeat request (HARQ) as a candidate of the processing content of the delay processing.

Although not illustrated in FIG. 10, it is assumed that the processing content identifying unit 204 also performs an inquiry in which the scheduler ConstSched having the delay amount of 20 ms is input and an inquiry in which the scheduler ProbSched2 having the delay amount of 0.9 ms is input, and also obtains the candidates of the processing content of the delay processing of each scheduler. Furthermore, the processing content is not limited to the HARQ and the access processing illustrated in FIG. 10.

As described above, according to the first example embodiment, the clustering unit 203 analyzes the distribution of the reception interval (delay jitter) of the packets received via the communication path to estimate the type (ConstSched or ProbSched) and the delay amount of the delay processing of the scheduler interposed between the transmission terminal 100 and the reception terminal 200. Therefore, as the delay characteristic occurring in the communication path, the delay characteristic such as the type and the delay amount of the delay processing performed on the communication path can be confirmed.

Furthermore, according to the first example embodiment, the processing content identifying unit 204 obtains specific processing content of the delay processing from the delay processing DB 205 based on the type and the delay amount of the delay processing of the scheduler estimated by the clustering unit 203. Therefore, not only the delay characteristics such as the type and the delay amount of the delay processing but also the specific processing content of the delay processing can also be confirmed.

Although the number of communication paths is not mentioned in the first example embodiment, the transmission terminal 100 and the reception terminal 200 may transmit and receive packets via a plurality of communication paths. In this case, the clustering unit 203 may estimate the delay characteristic (the type and the delay amount of the delay processing) for each of the plurality of communication paths, and the processing content identifying unit 204 may identify the processing content of the delay processing for each of the plurality of communication paths.

Second Example Embodiment

In the second example embodiment, when a plurality of delay processing are mixed between the transmission terminal 100 and the reception terminal 200 (when a plurality of schedulers are interposed), the processing content of the plurality of delay processing are specified using the state transition probability.

First, a configuration example of an analysis system 1A according to a second example embodiment will be described with reference to FIG. 11.

Figure 11:
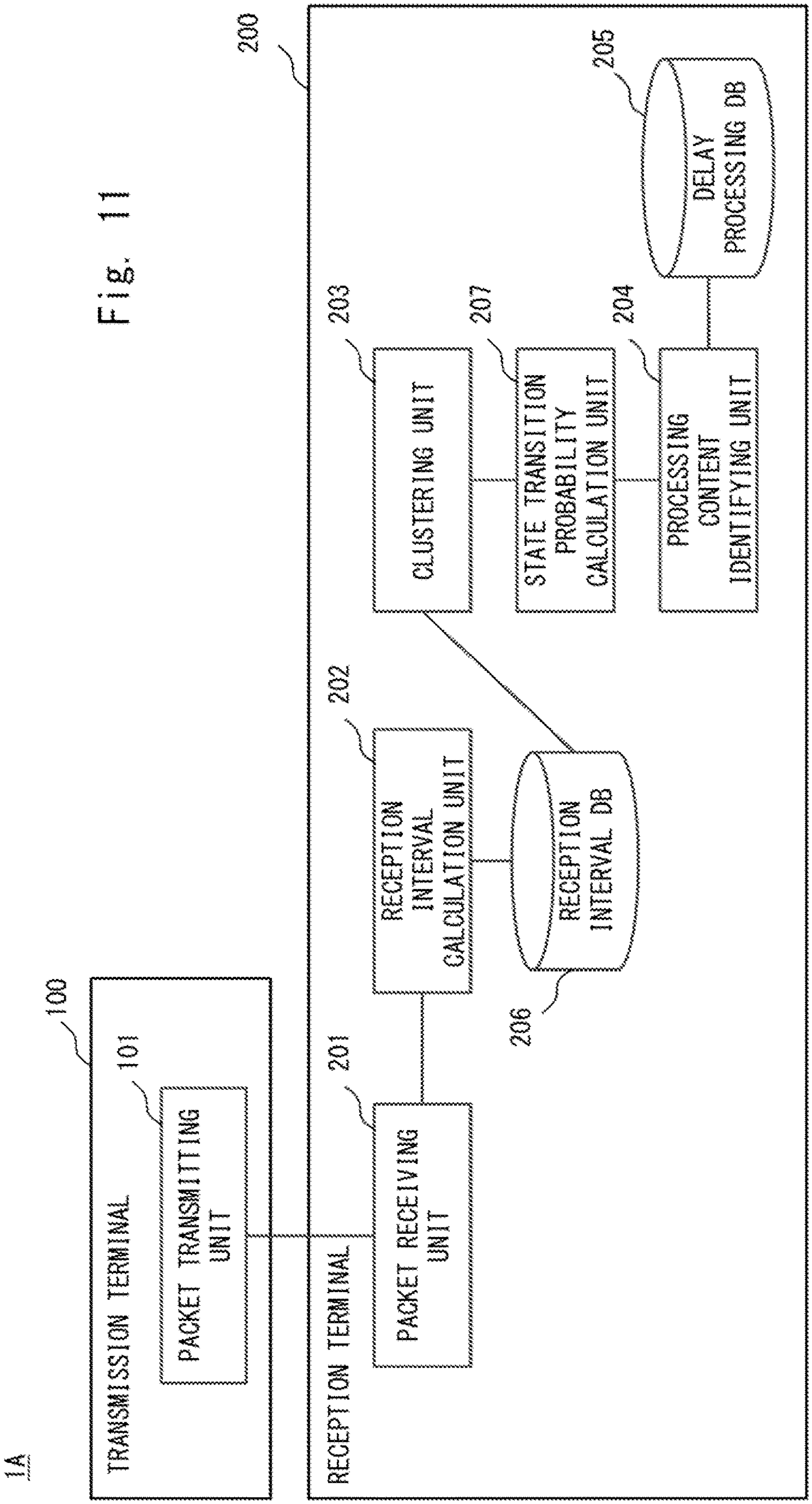
FIG. 11 is a block diagram illustrating a configuration example of an analysis system according to a second example embodiment.

As illustrated in FIG. 11, the analysis system 1A according to the second example embodiment is different from the configuration of FIG. 1 of the first example embodiment described above in that a reception interval DB 206 and a state transition probability calculation unit 207 are added to the reception terminal 200. However, this is not the sole case, and the reception interval DB 206 and the state transition probability calculation unit 207 may be provided on a device different from the reception terminal 200 or on a cloud. Furthermore, the reception interval DB 206 may be provided on a cloud and shared with a plurality of devices.

The reception interval DB 206 is a database that stores information on the packet reception interval calculated by the reception interval calculation unit 202. The clustering unit 203 acquires the packet reception interval from the reception interval DB 206. However, the clustering unit 203 may directly acquire the packet reception interval from the reception interval calculation unit 202. In this case, the reception interval DB 206 does not need to be provided.

The state transition probability calculation unit 207 calculates a state transition probability indicating a transition probability between clusters after division by clustering by the clustering unit 203. Specifically, the state transition probability calculated by the state transition probability calculation unit 207 indicates a transition probability between the cluster to which the packet with the packet number i belongs and the cluster to which the packet with the packet number i+1 belongs.

Figure 12:
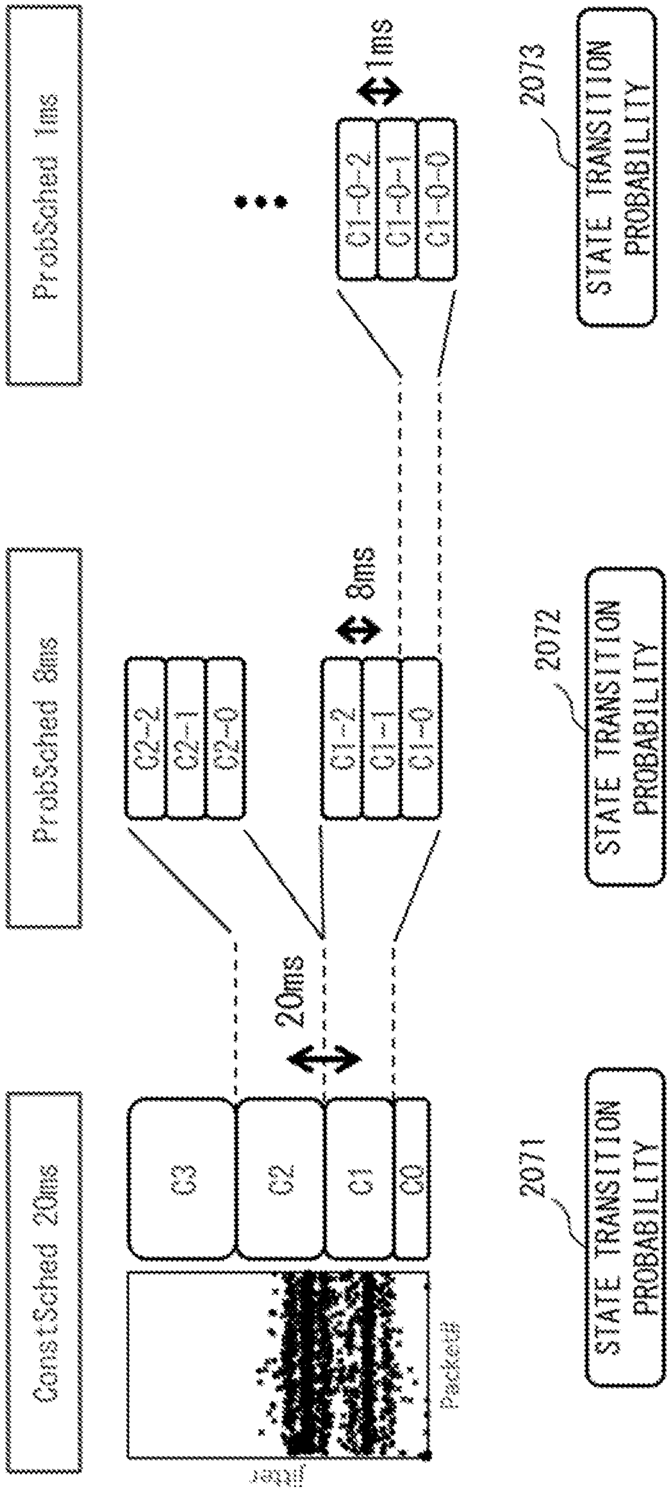
FIG. 12 is a diagram illustrating a schematic operation example of a clustering unit and a state transition probability calculation unit according to the second example embodiment.

For example, as illustrated in FIG. 12, in the clustering of the first layer by the clustering unit 203, the distribution of the delay jitter is divided into two clusters C1 and C2. Here, a cluster C0 below the cluster C1 and a cluster C3 above the cluster C2 are further considered. The cluster C0 is a cluster to which a packet received substantially at the same time as a previous packet belongs, and the cluster C3 is a cluster to which a packet whose reception interval is an outlier (e.g., in a case where twice the transmission interval by the packet transmitting unit 101 is set as a threshold, a value larger than the threshold is set) belongs.

In this case, the state transition probability calculation unit 207 calculates the state transition probability 2071 indicating the transition probability between the clusters C0, C1, C2, and C3 after the division by the clustering of the first layer. An example of the state transition probability 2071 is illustrated in FIG. 13. For example, when the packet with packet number i belongs to the cluster C0, the probability that the packet with the packet number i+1 belongs to the cluster C0 is 0.11765.

In addition, in the clustering of the second layer by the clustering unit 203, the cluster C1 is divided into three clusters C1-0, C1-1, and C1-2, and the cluster C2 is divided into three clusters C2-0, C2-1, and C2-2.

In this case, the state transition probability calculation unit 207 calculates the state transition probability 2072 indicating the transition probability between the clusters C0, C1-0, C1-1, C1-2, C2-0, C2-1, C2-2, and C3 after the division by the clustering of the second layer. An example of the state transition probability 2072 is illustrated in FIG. 14.

In addition, in the clustering of the third layer by the clustering unit 203, the cluster C1-0 is divided into three clusters C1-0-0, C1-0-1, and C1-0-2. Similarly, the clusters C1-1, C1-2, C2-0, C2-1, and C2-2 are also divided into three.

In this case, the state transition probability calculation unit 207 calculates a state transition probability 2073 indicating a transition probability between clusters C0, C1-0-0, C1-0-1, C1-0-2, C1-1-0, C1-1-1, C1-1-2, C1-2-0, C1-2-1, C1-2-2, C2-0-0, C2-0-1, C2-0-2, C2-1-0, C2-1-1, C2-1-2, C2-2-0, C2-2-1, C2-2-2, C3 after division by clustering of the third layer. An example of the state transition probability 2073 is illustrated in FIG. 15. Note that, in FIG. 15, some values of the state transition probability are omitted.

Note that, in the above-described example, the state transition probability calculation unit 207 calculates the state transition probability every time clustering for one layer is performed, but the present invention is not limited thereto. As described later, what is used by the processing content identifying unit 204 is the state transition probability 2073 after the clustering of the third layer is performed. Therefore, the state transition probability calculation unit 207 may not calculate the state transition probabilities 2071 and 2072 after the clustering of the first layer and the second layers is performed, and may calculate only the state transition probability 2073 after the clustering of the third layer is performed.

Figure 16:
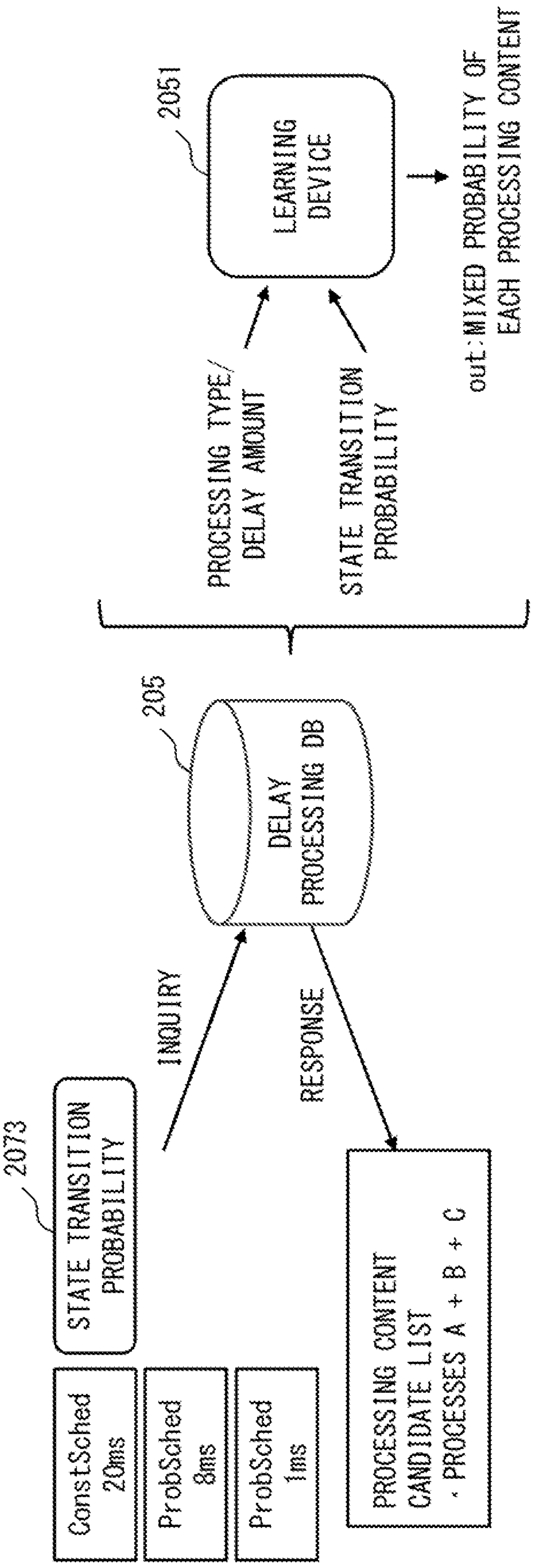
FIG. 16 is a diagram illustrating a schematic operation example of a processing content identifying unit and a delay processing DB according to the second example embodiment.

Here, as illustrated in FIG. 16, the delay processing DB 205 according to the second example embodiment includes a learning device 2051. The learning device 2051 is learned by machine learning so as to output the mixing probability of each processing content to be a candidate when the type and the delay amount of the delay processing are input. However, the learning device 2051 is not limited to being provided in the delay processing DB 205, and the delay processing DB 205 and the learning device 2051 may be provided separately.

Therefore, in a case where the clustering as illustrated in FIG. 12 is performed by the clustering unit 203, the processing content identifying unit 204 inputs the scheduler ConstSched having a delay amount of 20 ms, the scheduler ProbSched having a delay amount of 8 ms, and the scheduler ProbSched having a delay amount of 1 ms estimated by the clustering of the respective layers, inputs the state transition probability 2073 after the clustering of the third layer, and inquires the delay processing DB 205 about specific processing content of the delay processing.

Then, the delay processing DB 205 returns specific processing content of the delay processing to the processing content identifying unit 204 as a response to the inquiry. At this time, the learning device 2051 outputs the mixing probability of each processing content to be a candidate. The delay processing DB 205 selects processing contents in the order of high mixing probability by the number of input types of delay processing. In the example of FIG. 16, since three types of delay processing are input, three processing contents A+B+C are returned as candidates of the processing contents of the delay processing.

Note that, in the example of FIG. 16, the processing content identifying unit 204 makes an inquiry on three types of delay processing at once, but in a case where it is desired to identify processing contents of specific two types of delay processing, the state transition probabilities of the specific two types of delay processing may be input. In this case, the processing content identifying unit 204 may calculate the surrounding probability from the state transition probabilities using the three types of delay processing to obtain the state transition probabilities of the specific two types of delay processing. For example, in FIG. 12, in a case where it is desired to identify the processing contents of the scheduler ConstSched having the delay amount of 20 ms and the scheduler ProbSched having the delay amount of 8 ms, the processing content identifying unit 204 calculates the surrounding probability from the state transition probability 2073 to obtain the state transition probability 2072.

As described above, according to the second example embodiment, the state transition probability calculation unit 207 calculates a state transition probability indicating a transition probability between clusters after division by clustering of the clustering unit 203. Therefore, when a plurality of delay processing are mixed (a plurality of schedulers are interposed), the processing contents of the plurality of delay processing can be collectively identified using the state transition probability.

The other effects are similar to effects according to the first example embodiment described above.

Third Example Embodiment

In the third example embodiment, whether or not delay processing is mixed between the transmission terminal 100 and the reception terminal 200 (whether or not a scheduler is interposed) is determined in advance.

First, a configuration example of an analysis system 1B according to the third example embodiment will be described with reference to FIG. 17.

Figure 17:
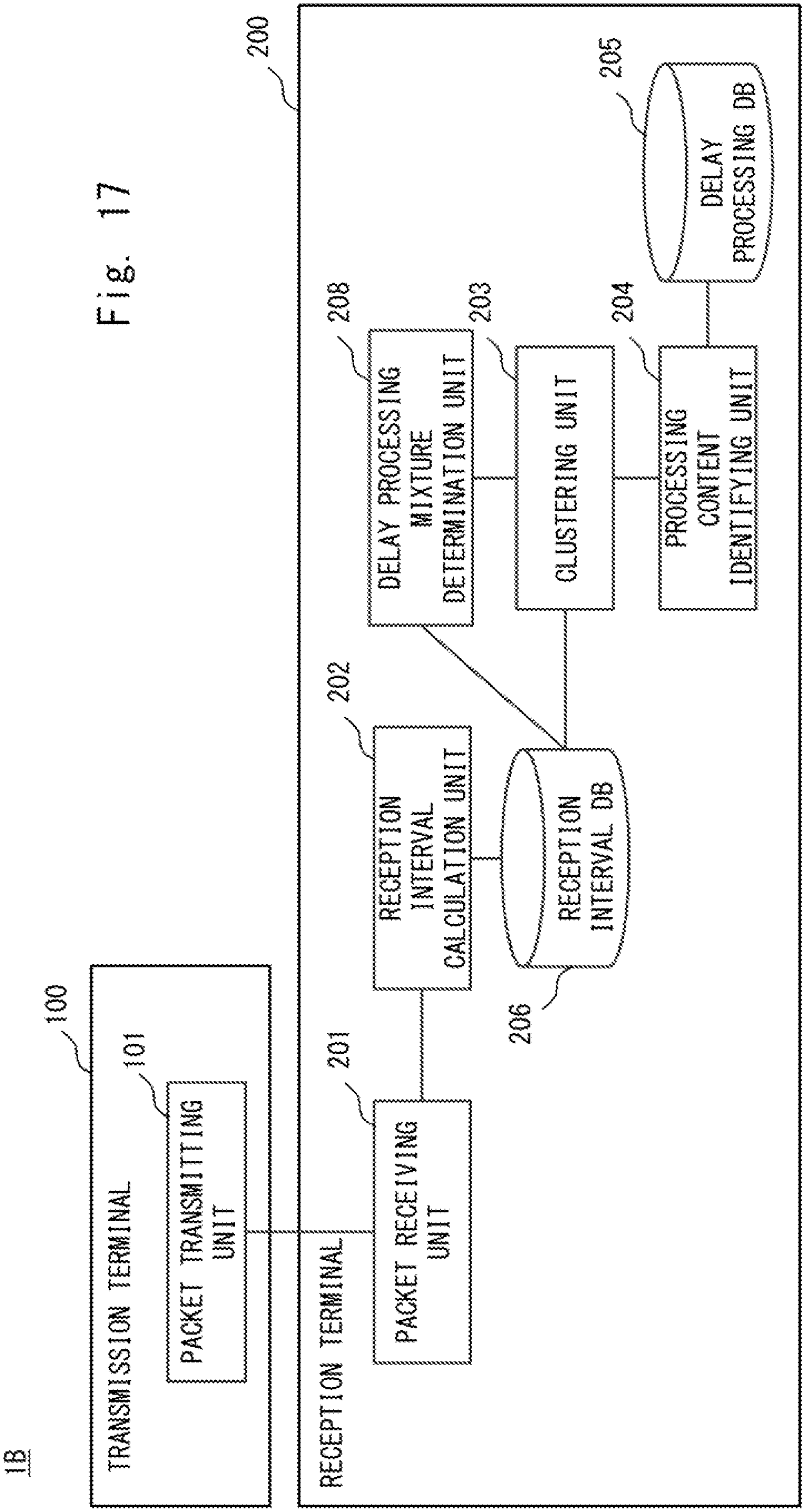
FIG. 17 is a block diagram illustrating a configuration example of an analysis system according to a third example embodiment.

As illustrated in FIG. 17, the analysis system 1B according to the third example embodiment is different from the configuration of FIG. 1 of the first example embodiment described above in that a reception interval DB 206 and a delay processing mixture determination unit 208 are added to the reception terminal 200. However, this is not the sole case, and the reception interval DB 206 and the delay processing mixture determination unit 208 may be provided on a device different from the reception terminal 200 or on a cloud. Furthermore, the reception interval DB 206 may be provided on a cloud and shared with a plurality of devices.

The probability distribution of the delay jitter can be obtained from the distribution of the delay jitter. The probability distribution of the delay jitter can be expressed by a mixed Laplace distribution obtained by mixing a plurality of Laplace distributions.

Furthermore, the probability distribution of the delay jitter differs depending on whether or not the delay processing is mixed between the transmission terminal 100 and the reception terminal 200 (whether or not the scheduler is interposed).

Figure 18:
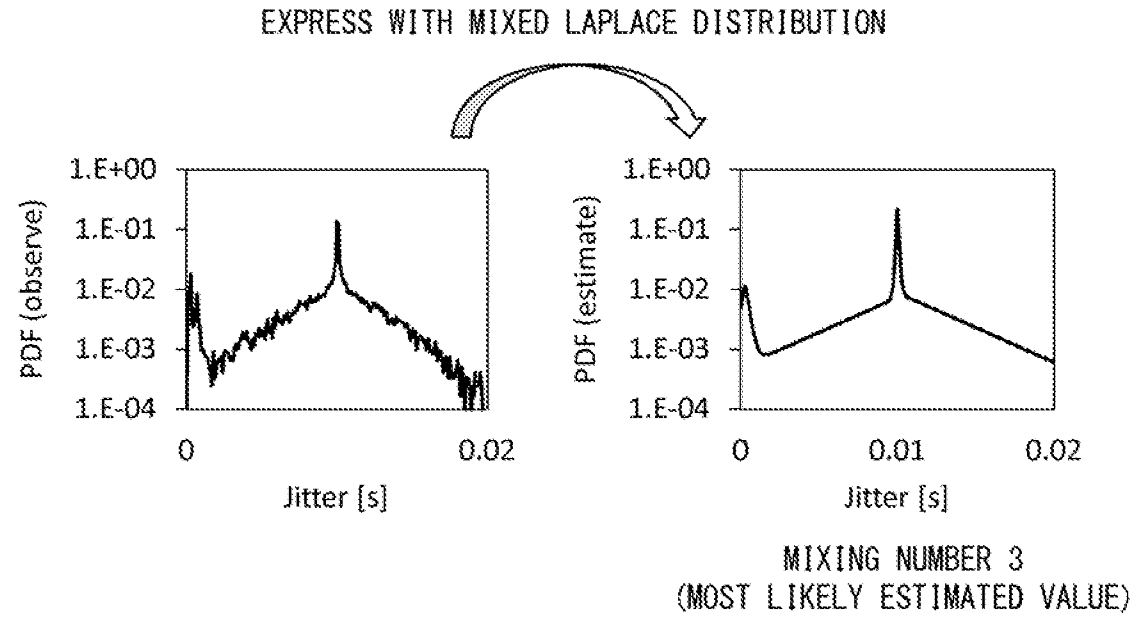
FIG. 18 is a diagram illustrating an example in which a probability distribution of a delay jitter in a case where the scheduler is not interposed is expressed by a mixed Laplace distribution.
Figure 19:
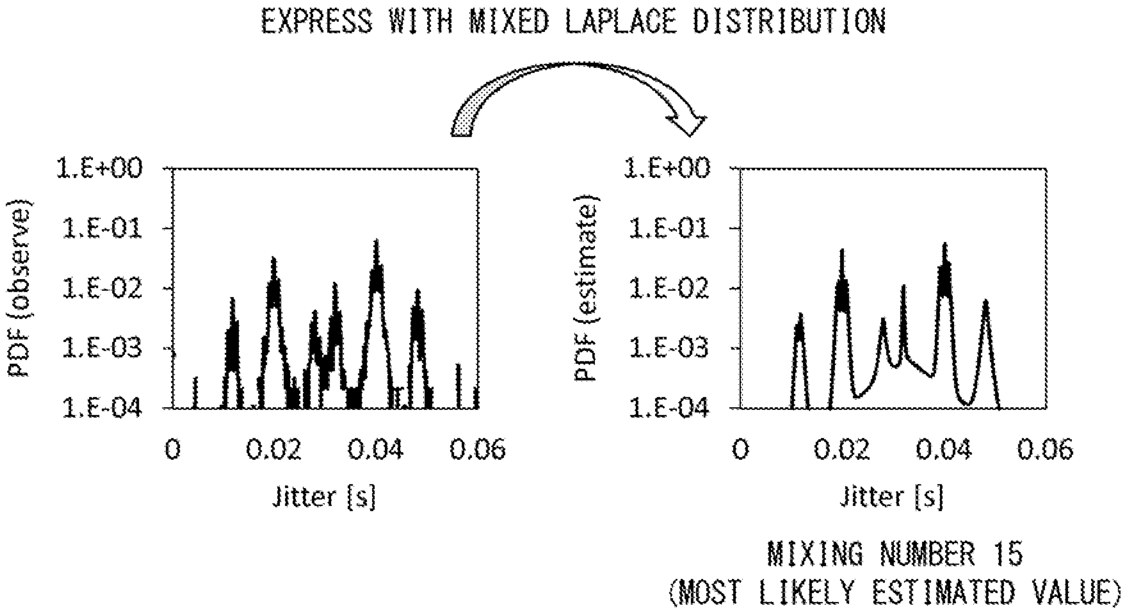
FIG. 19 is a diagram illustrating an example in which a probability distribution of a delay jitter in a case where the scheduler is interposed is expressed by a mixed Laplace distribution.

FIG. 18 illustrates an example of the probability distribution of the delay jitter in a case where the scheduler is not interposed, and FIG. 19 illustrates an example of the probability distribution of the delay jitter in a case where the scheduler is interposed. Note that in FIGS. 18 and 19, the left side indicates observation data of the probability distribution of the delay jitter, and the right side indicates data in which the observation data is expressed by a mixed Laplace distribution. Furthermore, in each piece of data of FIGS. 18 and 19, the horizontal axis represents a delay jitter (reception interval), and the vertical axis represents a probability density function (PDF) representing a probability of occurrence of the delay jitter.

As illustrated in FIG. 18, in a case where the scheduler is not interposed, the probability distribution of the delay jitter can be expressed by a mixed Laplace distribution in which three Laplace distributions are mixed, that is, a mixed Laplace distribution with a mixing number of 3. On the other hand, as illustrated in FIG. 19, in a case where the scheduler is interposed, the mixed Laplace distribution expressing the probability distribution of the delay jitter has a mixing number of 15, and the mixing number increases greatly.

Therefore, the delay processing mixture determination unit 208 compares the mixing number of the mixed Laplace distribution expressing the probability distribution of the delay jitter with the threshold value, and determines that the delay processing is mixed (the scheduler is interposed) between the transmission terminal 100 and the reception terminal 200 when the mixing number exceeds the threshold value. The threshold value of the mixing number may be, for example, 3.

In a case where the delay processing mixture determination unit 208 determines that the delay processing is mixed, the clustering unit 203 and the processing content identifying unit 204 provided at the subsequent stage perform the above-described processing. That is, the clustering unit 203 performs processing of estimating the type and the delay amount of the delay processing, and the processing content identifying unit 204 performs process of identifying the processing content of the delay processing.

The reception interval DB 206 is a database similar to FIG. 11 of the second example embodiment described above. The clustering unit 203 and the delay processing mixture determination unit 208 acquire the packet reception interval from the reception interval DB 206. However, the clustering unit 203 and the delay processing mixture determination unit 208 may directly acquire the packet reception interval from the reception interval calculation unit 202. In this case, the reception interval DB 206 does not need to be provided.

Next, a flow example of a schematic operation of the delay processing mixture determination unit 208 will be described with reference to FIG. 20.

Figure 20:
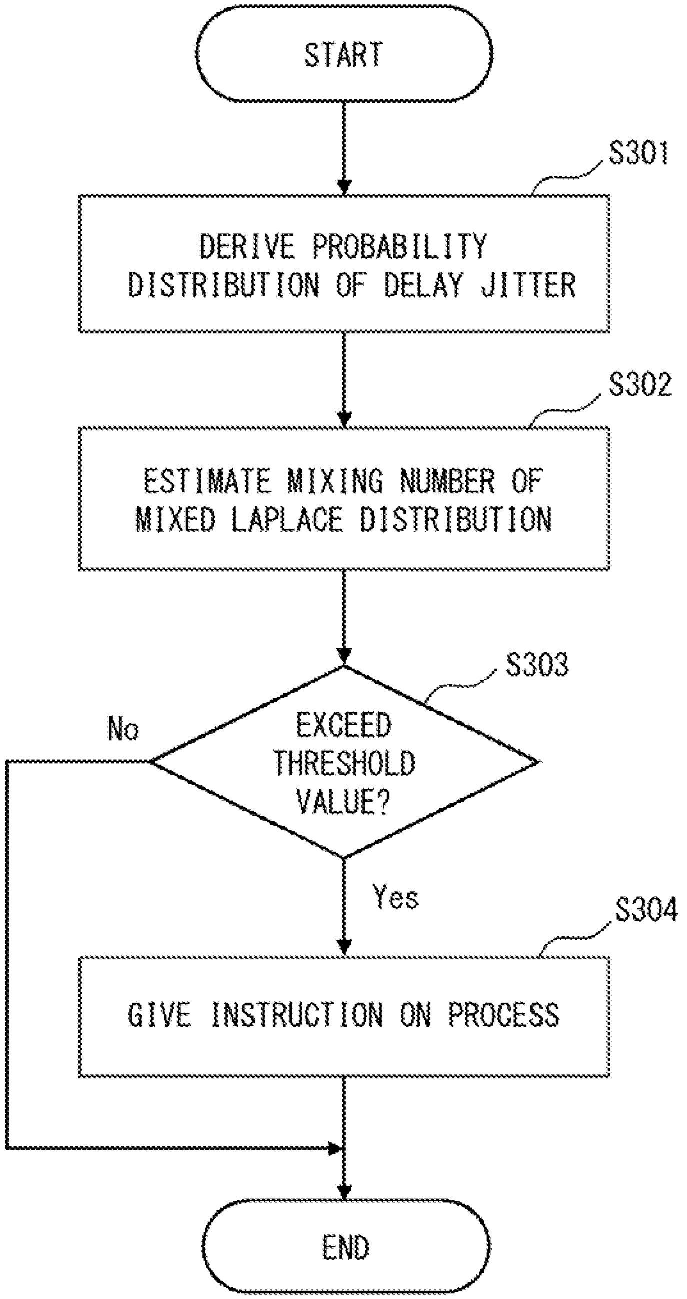
FIG. 20 is a flowchart illustrating a flow example of a schematic operation of a delay processing mixture determination unit according to the third example embodiment.

As illustrated in FIG. 20, first, the delay processing mixture determination unit 208 derives the probability distribution of the delay jitter based on the packet reception interval (step S301).

Next, the delay processing mixture determination unit 208 estimates the mixing number of Laplace distributions when the probability distribution of the delay jitter is expressed with the mixed Laplace distribution (step S302).

Next, the delay processing mixture determination unit 208 determines whether or not the mixing number exceeds a threshold value (step S303).

In step S303, when the mixing number does not exceed the threshold value (No in step S303), the delay processing mixture determination unit 208 determines that the delay processing is not mixed (the scheduler is not interposed), and ends the process.

On the other hand, in step S303, when the mixing number exceeds the threshold value (Yes in step S303), the delay processing mixture determination unit 208 determines that the delay processing is mixed (the scheduler is interposed), and instructs the clustering unit 203 and the processing content identifying unit 204 to perform the above-described processing (step S304). Thereafter, the process is ended.

As described above, according to the third example embodiment, the delay processing mixture determination unit 208 determines whether or not delay processing is mixed between the transmission terminal 100 and the reception terminal 200 (whether or not a scheduler is interposed) in advance. Therefore, only in a case where determination is made that the delay processing is mixed, the clustering unit 203 and the processing content identifying unit 204 may perform the above-described processing. As a result, the processing loads of the clustering unit 203 and the processing content identifying unit 204 can be reduced.

The other effects are similar to effects according to the first example embodiment described above.

Fourth Example Embodiment

For example, it is considered that the carrier wants to narrow down the cause of the degradation of the communication quality in order to improve the communication quality. In addition, between an application that communicates at a 10 ms cycle and an application that communicates at a 1 s cycle, an allowable delay jitter is more severe for an application that communicates at a 10 ms cycle. Therefore, when using an application that communicates at a 10 ms cycle, it is considered that the user wants to select a communication path with a small delay jitter.

Therefore, in the fourth example embodiment, an analysis result of a delay occurring in a communication path is displayed on the reception terminal 200 side.

A configuration example of an analysis system 1C according to the fourth example embodiment will be described with reference to FIG. 21.

Figure 21:
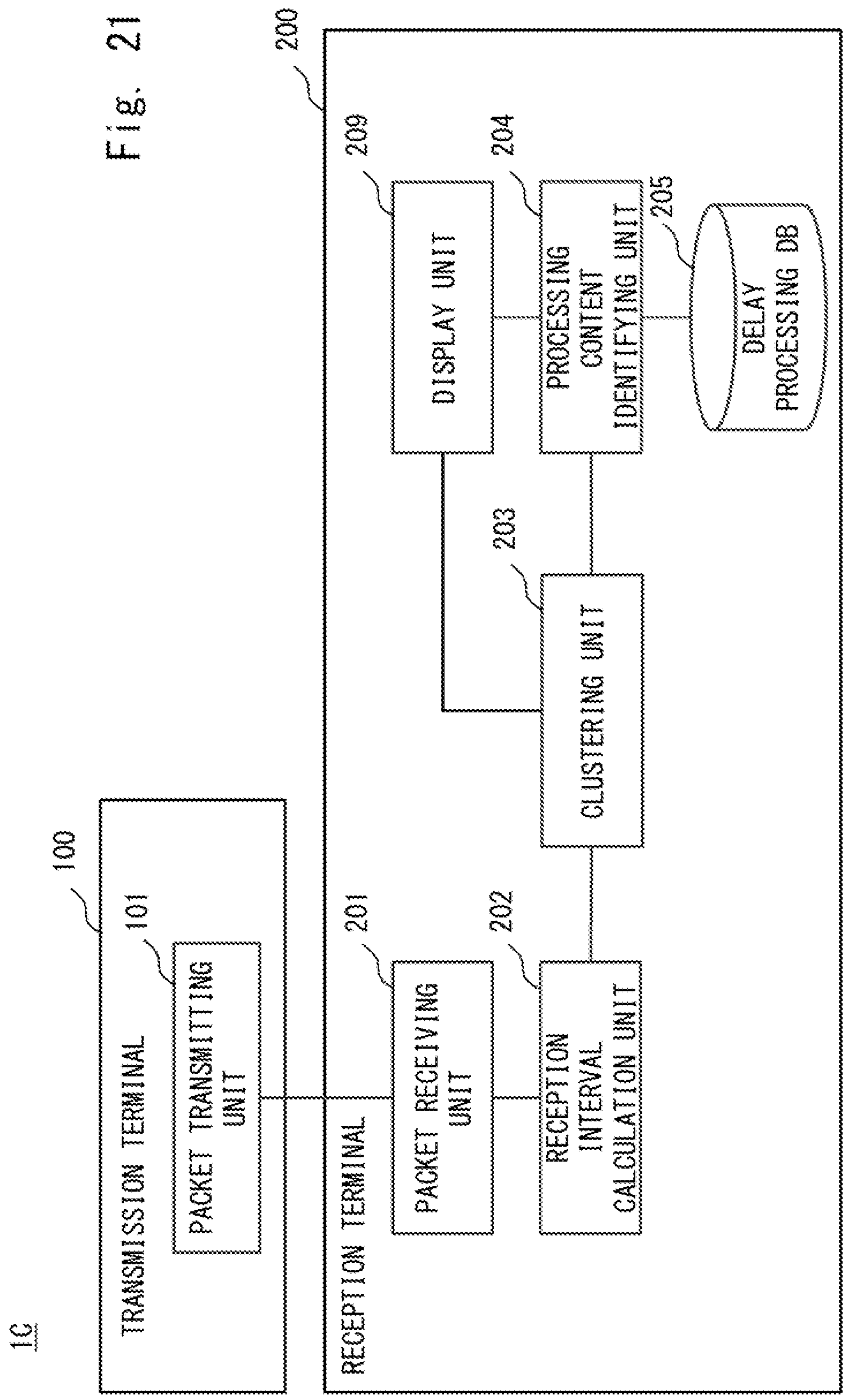
FIG. 21 is a block diagram illustrating a configuration example of an analysis system according to a fourth example embodiment.

As illustrated in FIG. 21, the analysis system 1C according to the fourth example embodiment is different from the configuration in FIG. 1 of the first example embodiment in that display unit 209 is added to reception terminal 200. However, the present invention is not limited thereto, and the display unit 209 may be provided in a device different from the reception terminal 200.

The display unit 209 displays an analysis result (at least one of the delay characteristics (the type and the delay amount of the delay processing) estimated by the clustering unit 203 and the processing content of the delay processing identified by the processing content identifying unit 204) of the delay occurring in the communication path. At this time, the display unit 209 may display processing contents as a delay factor occurring in the communication path.

For example, in a case where the delay characteristic of the communication path is displayed, the display unit 209 may perform display as illustrated in FIG. 22 or 23.

In the example of FIG. 22, the display unit 209 displays a specific delay characteristic of the communication path. Specifically, the delay amount is displayed in the case of fixed delay processing (ConstSched), and the probability and the delay amount are displayed in the case of probabilistic delay processing (ProbSched). In the example of FIG. 22, the communication path A indicates that a process that fixedly generates a delay of 3 ms and a process that generates a delay of 5 ms with a probability of 7% are performed.

Furthermore, in the example of FIG. 23, the display unit 209 displays the delay characteristics of the communication path by levels. Specifically, the level of the length of the delay amount is displayed in the case of fixed delay processing, and the level of risk is displayed in the case of probabilistic delay processing. As a method of classifying the delay characteristic of the communication path into levels, a method of holding a table as illustrated in FIG. 24 in advance and classifying into levels according to the table is considered.

When both the delay characteristic and the processing content of the delay processing of the communication path are displayed, the display unit 209 may perform the display as illustrated in FIG. 25. Note that, in the example of FIG. 25, a specific delay characteristic of the communication path is displayed, as illustrated in FIG. 22, as the delay characteristic of the communication path, but the delay characteristic of the communication path may be displayed by levels as illustrated in FIG. 23.

Furthermore, as described above, the transmission terminal 100 and the reception terminal 200 can transmit and receive packets via a plurality of communication paths. In this case, the clustering unit 203 may estimate the delay characteristic (the type and the delay amount of the delay processing) for each of the plurality of communication paths, and the processing content identifying unit 204 may identify the processing content of the delay processing for each of the plurality of communication paths.

Therefore, the display unit 209 can display the delay characteristic and the processing content of the delay processing for each of the plurality of communication paths.

Therefore, the display unit 209 may display a list of all the delay characteristics and the processing contents of the delay processing of the plurality of communication paths.

Alternatively, the display unit 209 may display only the delay characteristic and the processing content of the delay processing of the communication path selected by the user or the carrier among the plurality of communication paths.

Here, in a case where a delay occurs in the communication path, it is considered that the user merely needs to know a schematic delay characteristic. Therefore, when the reception terminal 200 is a terminal of the user and the user inputs the communication path name, it is conceivable that the display unit 209 displays the delay characteristic of the relevant communication path as illustrated in FIGS. 22 and 23.

On the other hand, in a case where a delay occurs in the communication path, it is conceivable that the carrier desires to know not only a schematic delay characteristic but also a specific processing content of the delay processing for maintenance or the like. Therefore, when the reception terminal 200 is a terminal of the user and the user inputs the communication path name, it is conceivable that the display unit 209 displays not only the delay characteristic of the relevant communication path but also the processing content of the delay processing as illustrated in FIG. 25.

Furthermore, in a case where the user or the carrier inputs an area name, the display unit 209 may display a list of communication paths available in the area as well as display delay characteristics and processing contents of the delay processing of the delay paths.

As described above, according to the fourth example embodiment, at least one of the delay characteristic and the processing content of the delay processing is displayed as the analysis result of the delay occurring in the communication path on the reception terminal 200 side. At this time, the communication path to be displayed can be selected by the user or the carrier.

Therefore, for example, in a case where the reception terminal 200 is a terminal of the user who uses the application, the user can know the delay characteristic of each of the plurality of communication paths. Therefore, the user can select an appropriate communication path in order to stably obtain the data of the application.

Furthermore, in a case where the reception terminal 200 is a terminal of a carrier that performs maintenance or the like of the communication path, the carrier can know specific processing contents of the delay processing performed on the communication path. Therefore, the carrier can take measures corresponding to the processing content of the delay processing.

Fifth Example Embodiment

Therefore, in the fifth example embodiment, an analysis result of a delay occurring in a communication path is displayed on the transmission terminal 100 side.

A configuration example of an analysis system 1D according to the fifth example embodiment will be described with reference to FIG. 26.

Figure 26:
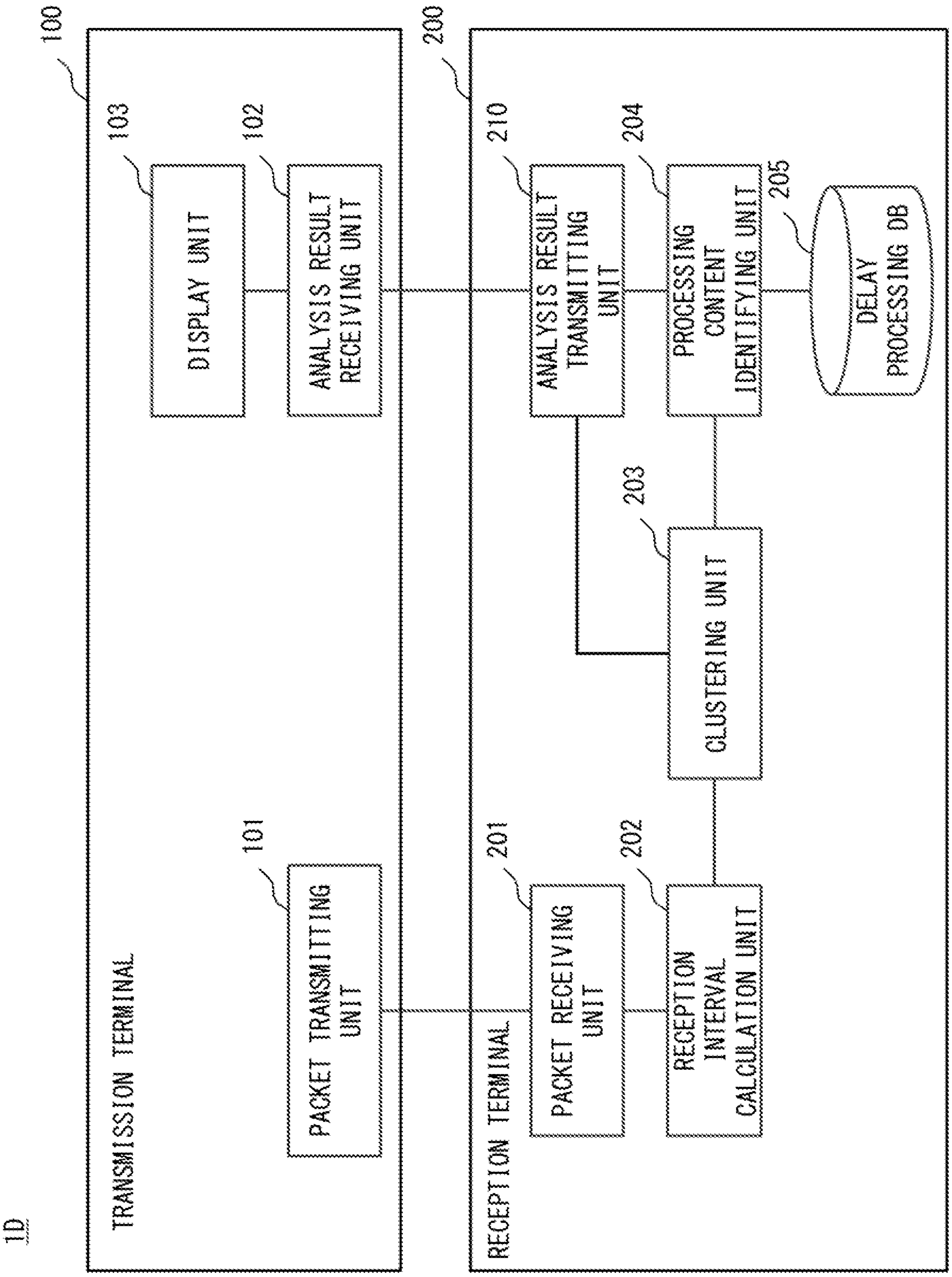
FIG. 26 is a block diagram illustrating a configuration example of an analysis system according to a fifth example embodiment.

As illustrated in FIG. 26, the analysis system 1D according to the fifth example embodiment is different from the configuration in FIG. 1 of the first example embodiment in that an analysis result receiving unit 102 and a display unit 103 are added to the transmission terminal 100, and in that an analysis result transmitting unit 210 is added to the reception terminal 200. However, the present invention is not limited thereto, and the analysis result receiving unit 102 and the display unit 103 may be provided on a device different from the transmission terminal 100 or on a cloud. Furthermore, the analysis result transmitting unit 210 may be provided on a device different from the reception terminal 200 or on a cloud.

The analysis result transmitting unit 210 transmits an analysis result (at least one of the delay characteristics (the type and the delay amount of the delay processing) estimated by the clustering unit 203 and the processing content of the delay processing identified by the processing content identifying unit 204) of the delay occurring in the communication path via the communication path.

The analysis result receiving unit 102 receives the analysis result of the delay occurring in the communication path from the analysis result transmitting unit 210 of the reception terminal 200 via the communication path.

The display unit 103 displays the analysis result of the delay occurring in the communication path received by the analysis result receiving unit 102.

For example, when displaying the estimation result of the delay characteristic of the communication path, the display unit 103 may perform display as illustrated in FIG. 22 or 23. When both the delay characteristic and the processing content of the delay processing of the communication path are displayed, the display unit 103 may perform the display as illustrated in FIG. 25.

Furthermore, the communication path displayed by the display unit 103 may be selected by a user or a carrier. Furthermore, in a case where the user or the carrier inputs an area name, the display unit 103 may display a list of communication paths available in the area as well as display delay characteristics and processing contents of the delay processing of the delay paths.

As described above, according to the fifth example embodiment, at least one of the delay characteristic and the processing content of the delay processing is displayed as the analysis result of the delay occurring in the communication path on the transmission terminal 100 side. At this time, the communication path to be displayed can be selected by the user or the carrier.

Therefore, for example, in a case where the transmission terminal 100 is a server that provides an application, the server can know the delay characteristic of each of the plurality of communication paths. Therefore, the server can select an appropriate communication path to stably provide the data of the application.

Furthermore, in a case where the transmission terminal 100 is a terminal of a carrier that performs maintenance or the like of the communication path, the carrier can know specific processing contents of the delay processing performed on the communication path. Therefore, the carrier can take measures corresponding to the processing content of the delay processing.

Sixth Example Embodiment

In the sixth example embodiment, an analysis result of a delay occurring in a communication path is used to control an application on the reception terminal 200 side.

A configuration example of an analysis system 1E according to the sixth example embodiment will be described with reference to FIG. 27.

Figure 27:
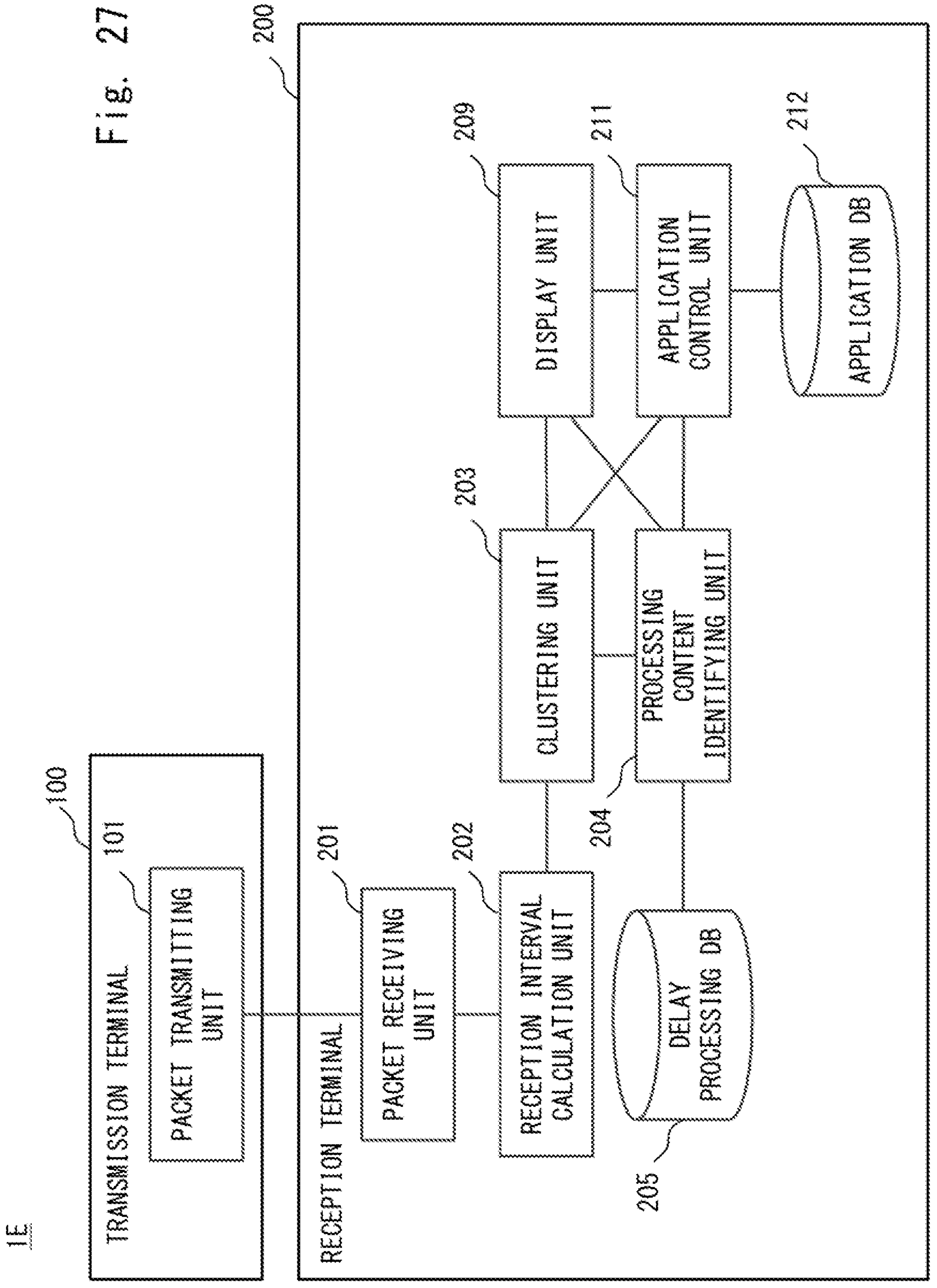
FIG. 27 is a block diagram illustrating a configuration example of an analysis system according to a sixth example embodiment.

As illustrated in FIG. 27, an analysis system 1E according to the sixth example embodiment is different from the configuration of FIG. 211 of the fourth example embodiment described above in that an application control unit 211 and an application DB 212 are added to a reception terminal 200. However, the present invention is not limited thereto, and the application control unit 211 and the application DB 212 may be provided on a device different from the reception terminal 200 or on a cloud. Furthermore, the application DB 212 may be provided on a cloud and shared with a plurality of devices. Note that, in FIG. 27 and the subsequent drawings, the "application" is appropriately abbreviated as an "app".

The application DB 212 is a database that stores information of an application that transmits or receives a packet via at least one of a plurality of communication paths among applications usable by the reception terminal 200. Specifically, as illustrated in FIG. 28, the application DB 212 stores information on a communication cycle and an allowable delay characteristic for each application. In FIG. 28, for example, the communication cycle is 10 ms for the application X, and in the case of fixed delay processing (ConstSched), up to a delay amount of 3 ms is allowed, and in the case of probabilistic delay processing (ProbSched), up to a probability of 10% is allowed and up to a delay amount of 5 ms is allowed. Note that the application DB 212 illustrated in FIG. 28 stores information on an allowable delay characteristic for each application, but information on a processing content of an allowable delay processing may be stored instead of or in addition thereto.

The application control unit 211 controls an application. For example, the application control unit 211 selects a communication path to be used by the application from among the plurality of communication paths based on a delay characteristic (a type and a delay amount of delay processing) or a processing content of the delay processing of each of the plurality of communication paths.

Hereinafter, a schematic operation example of the application control unit 211 will be described. In first to third operation examples described below, description will be made assuming that the processing is performed using the delay characteristic among the delay characteristic and the processing content of the delay processing of the communication path.

(1) First Operation Example

First, a first operation example of the application control unit 211 will be described with reference to FIG. 29. Note that FIG. 29 only extracts and illustrates the clustering unit 203, the application control unit 211, and the application DB 212 among the components of the reception terminal 200 illustrated in FIG. 27.

Figure 29:
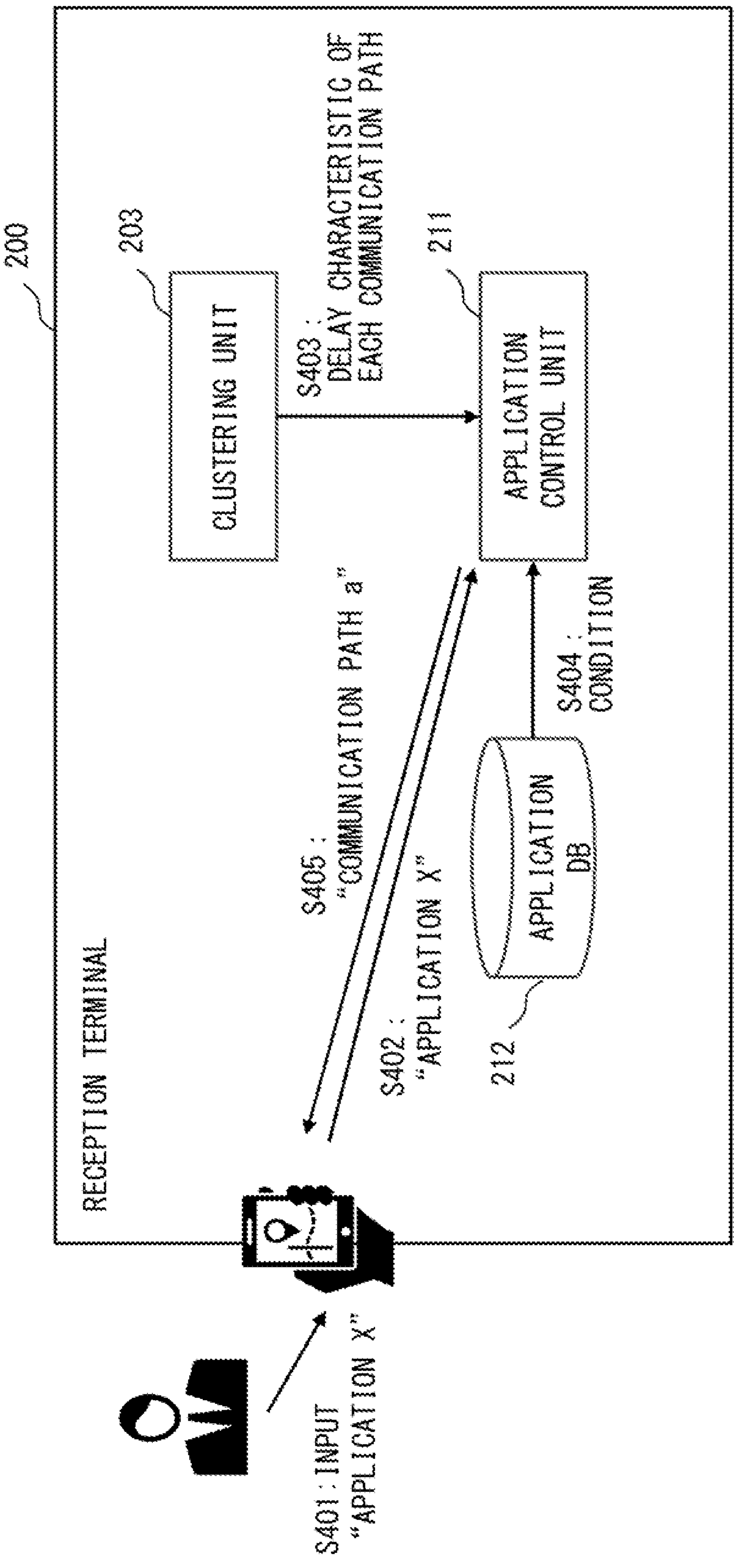
FIG. 29 is a diagram for describing a schematic operation example of an application control unit according to the sixth example embodiment.

As illustrated in FIG. 29, first, it is assumed that the user inputs an application name "application X" of an application to be used (step S401). The "application X" is acquired by the application control unit 211 (step S402).

Next, the application control unit 211 acquires delay characteristics (the type and the delay amount of delay processing) of each of the plurality of communication paths from the clustering unit 203 (step S403) (step S403), and acquires a condition of delay processing allowed for "application X" from the application DB 212 (step S404).

Next, the application control unit 211 selects one communication path that satisfies the condition of the delay characteristic allowed for "application X" from among the plurality of communication paths. Here, it is assumed that a communication path having a communication path name "communication path a" is selected. Therefore, the application control unit 211 displays "communication path a" on the display unit 209 (step S405).

(2) Second Operation Example

Next, a second operation example of the application control unit 211 will be described.

In the second operation example, the operations from steps S401 to S404 are similar to those in the first operation example described above, but the subsequent operations are different.

Figure 30:
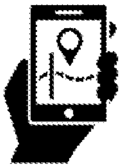
FIG. 30 is a diagram illustrating a display example of a list of communication paths and delay characteristics thereof displayed by the display unit according to the sixth example embodiment.

That is, in the second operation example, the application control unit 211 selects all the communication paths satisfying the condition of the delay characteristic allowed for "application X" from among the plurality of communication paths. Then, as illustrated in FIG. 30, the application control unit 211 causes the display unit 209 to display a list of all the selected communication paths and the delay characteristics thereof as choices, and causes the user to select a communication path from among the choices. Note that FIG. 30 illustrates a specific delay characteristic as the delay characteristic of the communication path.

(3) Third Operation Example

The third operation example is substantially the same as the second operation example described above, but is different in the display mode of the delay characteristic of the communication path displayed on the display unit 209.

Figure 31:
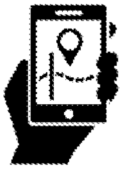
FIG. 31 is a diagram illustrating a display example of a list of communication paths and delay characteristics thereof displayed by the display unit according to the sixth example embodiment.

That is, in the third operation example, as illustrated in FIG. 31, the application control unit 211 displays the delay characteristic of the communication path on the display unit 209 by levels.

As described above, according to the sixth example embodiment, the application control unit 211 selects the communication path used by the application from among the plurality of communication paths based on, for example, the delay characteristic (the type and the delay amount of the delay processing) or the processing content of the delay processing of each of the plurality of communication paths. Therefore, when using the application, the user can use a communication path appropriate for the application.

Figure 32:
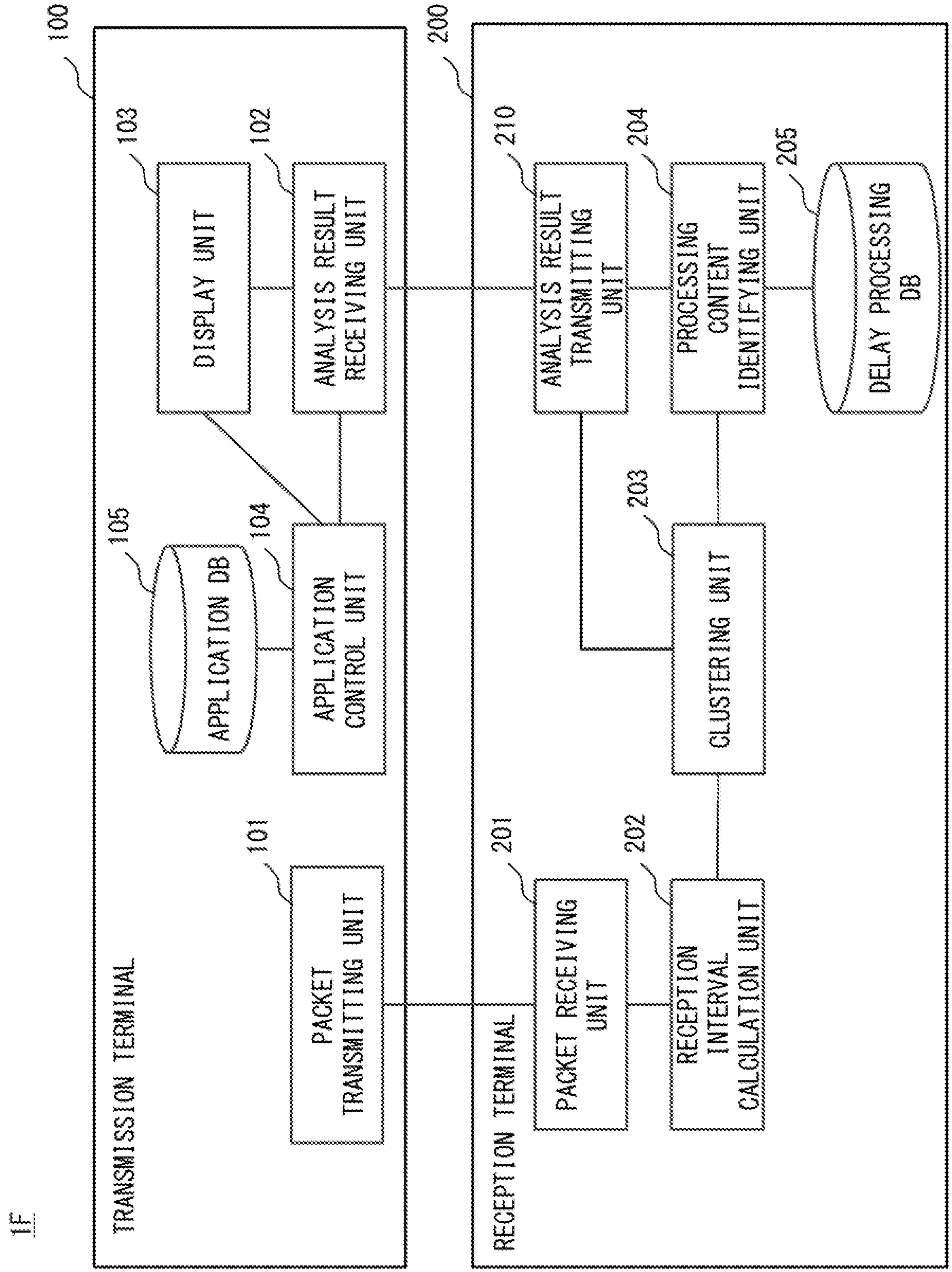
FIG. 32 is a block diagram illustrating a modified configuration example of the analysis system according to the sixth example embodiment.

Note that, in the sixth example embodiment, description has been made that the analysis result of the delay occurring in the communication path is used for the control of the application on the reception terminal 200 side, but the analysis result of the delay occurring in the communication path may be used for the control of the application on the transmission terminal 100 side. In this case, as illustrated in FIG. 32, the analysis system may have a configuration similar to that of FIG. 26 of the fifth example embodiment described above, and an application control unit 104 and an application DB 105 corresponding to the application control unit 211 and the application DB 212 may be added to the transmission terminal 100 side.

Other Example Embodiments

An appropriate communication path may be appropriately selected on the terminal side (terminal having a function corresponding to the reception terminal 200 described above) side. For example, the terminal uses the communication path x in the morning, but may switch to the communication path y in the afternoon due to change in the characteristics of the communication path x. In addition, for example, when the terminal moves from area A to area B, the terminal uses the communication path x in area A, but may switch to the communication path y in area B which is the movement destination. As a result, the user can use an appropriate communication path without realizing.

Furthermore, in communication in a building or communication in the same company, terminals (the transmission terminal 100 or the reception terminal 200) may cooperate with each other in consideration of priorities and the like, and a communication path may be selected. For example, in the example of FIG. 33, considering only terminal A, terminal A is preferably connected to communication path a having the best delay characteristic. However, considering the terminal B having the highest priority, the terminal B needs to be preferentially connected to the communication path a. Therefore, the terminal A is connected to the communication path b. Note that, in the example of FIG. 33, the terminals cooperate with each other, but similar cooperation may be performed between applications in the same terminal.

Figure 34:
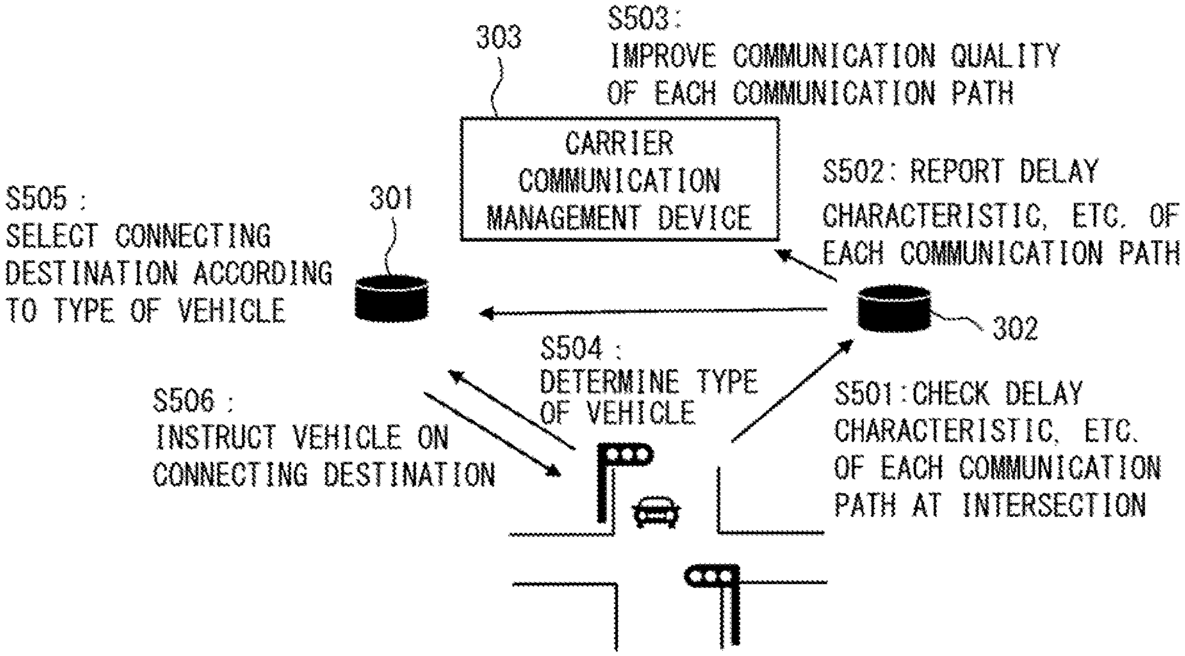
FIG. 34 is a diagram illustrating a configuration example of an analysis system according to another example embodiment.

In addition, the analysis system according to each example embodiment described above may be applied to control a vehicle at an intersection. The analysis system includes, for example, a multi-access edge computing (MEC) server 301, 302 and a carrier communication management device 303 as illustrated in FIG. 34. The MEC server 302 has a function corresponding to the reception terminal 200 described above. The MEC server 302 periodically checks the delay characteristic and the processing content of the delay processing of each communication path at the intersection (FIG. 35) (step S501), and reports the same to the MEC server 301 and the carrier communication management device 303 (step S502). The carrier communication management device 303 improves the communication quality of each communication path at the intersection based on the report from the MEC server 302 (step S503). On the other hand, the MEC server 301 specifies the type of vehicle entering the intersection (step S504), and selects the communication path of the connecting destination according to the priority of the specified type of vehicle (FIG. 36) (step S505). Thereafter, the MEC server 301 instructs the vehicle of the communication path on the connecting destination (step S506).

Note that the analysis system illustrated in FIG. 34 is not limited to being applied to an intersection, and may be applied to, for example, a place with a poor communication status (a building shadow, an elevated place, or the like) called a dead spot, an event venue, a sightseeing spot, an area where installation of a base station is limited, or the like. Furthermore, in the analysis system illustrated in FIG. 34, the control target is not limited to the vehicle, and may be equipment, a terminal of a staff member in an event venue, or the like. Furthermore, in the analysis system illustrated in FIG. 34, a report destination such as a delay characteristic of a communication path is set as a carrier, but this is not the sole case, and the report destination may be a department that manages the communication path, a department that manages an area in which the communication path is deployed (the police, local governments, and cities, towns and villages), or the like.

Figure 37:
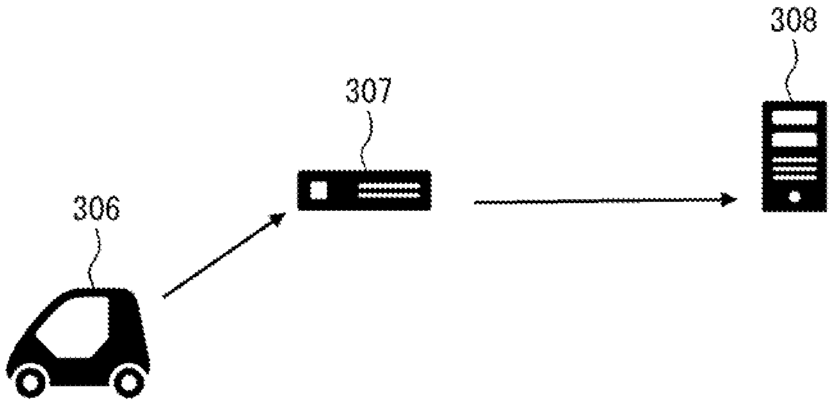
FIG. 37 is a diagram illustrating another configuration example of an analysis system according to another example embodiment.

In addition, the analysis system according to each example embodiment described above may be applied to control the AGV. For example, as illustrated in FIG. 37, the analysis system includes an AGV 306, an edge 307, and an aggregation device 308. The AGV 306 has a function corresponding to the reception terminal 200 described above. The AGV 306 may select the communication path between the AGV 306 and the edge 307 according to the position of the AGV 306. In addition, the AGV 306 may select not only the communication path between the AGV 306 and the edge 307 but also the communication path between the edge 307 and the aggregation device 308.

<Concept of Example Embodiments>

Next, a configuration example of an analysis system 1X conceptually illustrating the analysis systems 1, 1A to 1E according to the first to sixth example embodiments described above with reference to FIG. 38.

Figure 38:
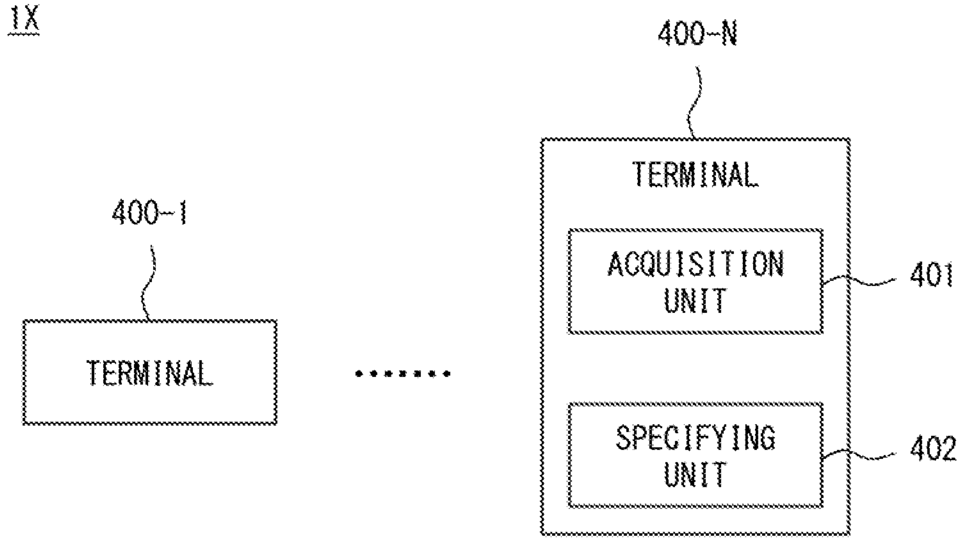
FIG. 38 is a block diagram illustrating a configuration example of an analysis system conceptually illustrating an example embodiment.

An analysis system 1X illustrated in FIG. 38 includes N (N is an integer greater than or equal to 2) terminals 400-1 to 400-N. Furthermore, at least one terminal (here, a terminal 400-N) among the terminals 400-1 to 400-N includes an acquisition unit 401 and a specifying unit 402.

Here, the terminals 400-1 to 400-N include a transmission terminal and a reception terminal that transmit and receive a plurality of packets to and from each other via a communication path. The terminal 400-N may be a reception terminal or a terminal (including a transmission terminal) different from the reception terminal.

The acquisition unit 401 acquires a reception interval of a plurality of packets received by the reception terminal via the communication path. When the terminal 400-N is a reception terminal, the acquisition unit 401 corresponds to the reception interval calculation unit 202 described above.

The specifying unit 402 specifies a delay characteristic of a delay occurring in the communication path based on the distribution of the reception intervals. The specifying unit 402 corresponds to the clustering unit 203 described above.

Next, a flow example of a schematic operation of the analysis system 1X illustrated in FIG. 38 will be described with reference to FIG. 39.

Figure 39:
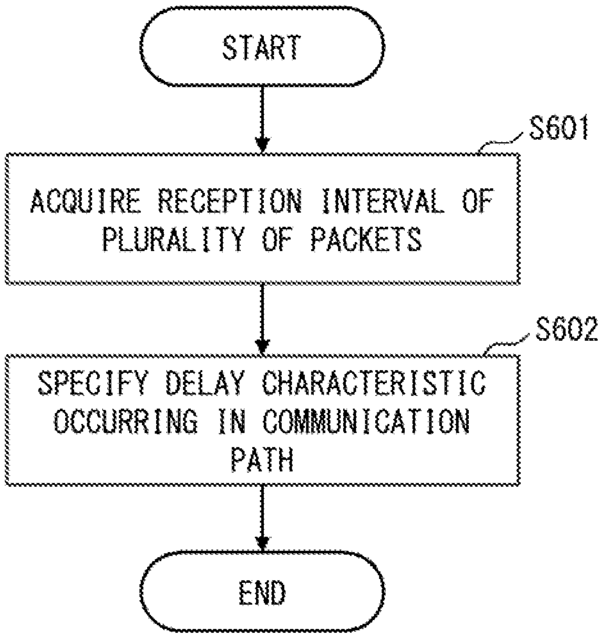
FIG. 39 is a flowchart illustrating a flow example of a schematic operation of the analysis system illustrated in FIG. 38.

As illustrated in FIG. 39, first, the acquisition unit 401 acquires a reception interval of a plurality of packets received by the reception terminal via the communication path (step S601).

Thereafter, the specifying unit 402 specifies the delay characteristic of the delay occurring in the communication path based on the distribution of the reception intervals (step S602).

As described above, according to the analysis system 1X illustrated in FIG. 38, the acquisition unit 401 acquires the reception interval of the plurality of packets received by the reception terminal via the communication path. The specifying unit 402 specifies a delay characteristic of a delay occurring in the communication path based on the distribution of the reception intervals. As a result, the delay characteristic occurring in the communication path can be confirmed.

Note that the specifying unit 402 may specify a type and a delay amount of delay processing performed on the communication path as the delay characteristic of the delay occurring in the communication path. Furthermore, the terminal 400-N may further include an identifying unit configured to identify the processing content of the delay processing based on the delay characteristic of the delay occurring in the communication path. This identifying unit corresponds to the processing content identifying unit 204 described above. The identifying unit may identify the processing content of the delay processing based on the type and the delay amount of the delay processing performed on the communication path.

Furthermore, the specifying unit 402 may perform clustering for dividing the distribution of reception intervals into a plurality of clusters, specify the type of delay processing performed on the communication path based on the number of divisions by the clustering, and specify the delay amount of the delay processing performed on the communication path based on the distance between the clusters after division by the clustering.

Furthermore, the specifying unit 402 may specify the type and the delay amount of each of a plurality of delay processing performed on the communication path by performing clustering for a plurality of times.

Furthermore, the terminal 400-N may further include a calculation unit that calculates a state transition probability indicating a transition probability between clusters after division by the clustering for a plurality of times. This calculation unit corresponds to the state transition probability calculation unit 207 described above. Furthermore, the identifying unit described above may identify the processing content of each of the plurality of delay processing performed on the communication path based on the type and the delay amount of each of the plurality of delay processing performed on the communication path and the state transition probability.

Furthermore, the terminal 400-N may further include a determination unit configured to determine whether or not delay processing has been performed on the communication path based on the mixing number of Laplace distributions in a case where the distribution of the probabilities of the reception intervals is expressed by a mixed Laplace distribution obtained by mixing a plurality of Laplace distributions. This determination unit corresponds to the delay processing mixture determination unit 208 described above. When the determination unit determines that the delay processing has been performed on the communication path, the specifying unit 402 may specify the type and the delay amount of the delay processing performed on the communication path, and the identifying unit may identify the processing content of the delay processing.

Furthermore, the terminal 400-N may further include a control unit that controls an application that transmits or receives packets via at least one of the plurality of communication paths. This control unit corresponds to the application control unit 211 described above. Furthermore, the specifying unit 402 may specify a delay characteristic of a delay occurring on the communication path for each of the plurality of communication paths, and the above-described control unit may select the communication path used by the application based on the delay characteristic of each of the plurality of communication paths. Alternatively, the specifying unit 402 may specify the type and the delay amount of the delay processing performed on the communication path for each of the plurality of communication paths, the identifying unit may identify the processing content of the delay processing performed on the communication path for each of the plurality of communication paths, and the control unit may select the communication path used by the application based on the type and the delay amount of the delay processing performed on each of the plurality of communication paths or based on the processing content of the delay processing performed on each of the plurality of communication paths.

<Hardware Configuration of Terminal According to Example Embodiment>

Next, a hardware configuration example of a computer 900 that implements the transmission terminal 100 and the reception terminal 200 according to the first to sixth example embodiments described above and the terminals 400-1 to 400-N according to the concept of the example embodiments described above will be described with reference to FIG. 40.

Figure 40:
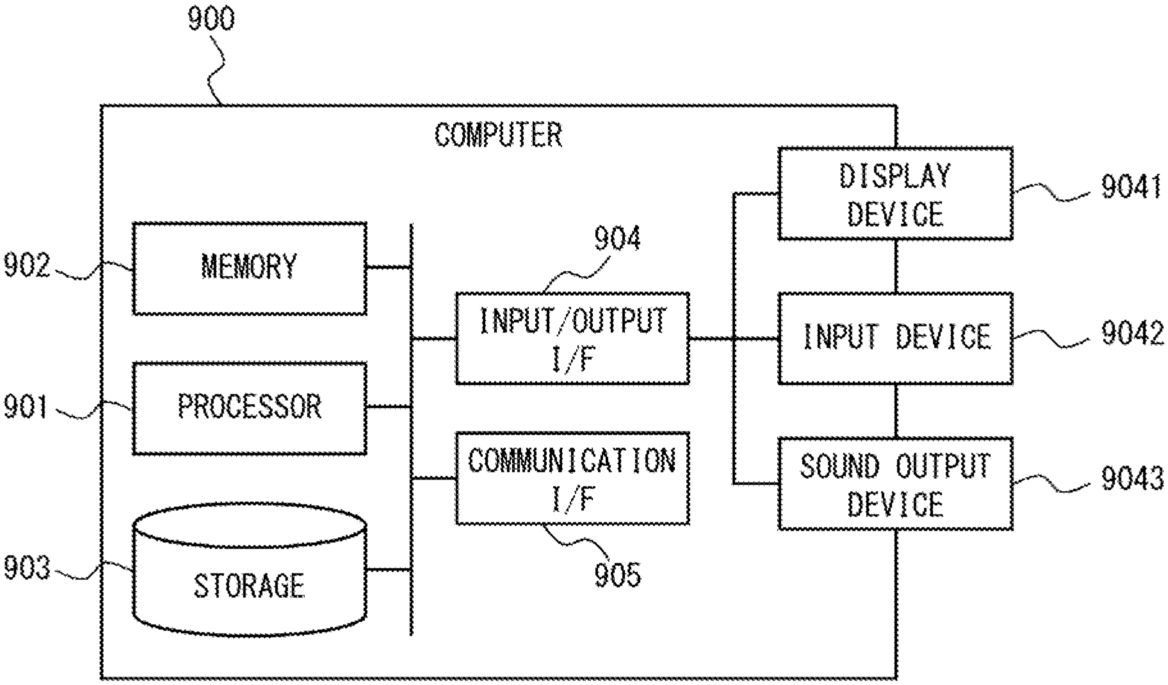
FIG. 40 is a block diagram illustrating a hardware configuration example of a transmission terminal, a reception terminal, and a computer that implements the terminal according to the example embodiment.

As illustrated in FIG. 40, the computer 900 includes a processor 901, a memory 902, a storage 903, an input/output interface (an input/output I/F) 904, a communication interface (a communication I/F) 905, and the like. The processor 901, the memory 902, the storage 903, the input/output interface 904, and the communication interface 905 are connected by a data transmission line for mutually transmitting or receiving data.

The processor 901 is an arithmetic processing device such as a central processing unit (CPU) or a graphics processing unit (GPU). The memory 902 is a memory such as a random access memory (RAM) or a read only memory (ROM). The storage 903 is a storage device such as a hard disk drive (HDD), a solid state drive (SSD), or a memory card. Furthermore, the storage 903 may be a memory such as a RAM or a ROM.

The storage 903 stores programs that realize functions of components included in the transmission terminal 100, the reception terminal 200, and the terminals 400-1 to 400-N. The processor 901 executes each of these programs, to realize each of the functions of the components included in the transmission terminal 100, the reception terminal 200, and the terminals 400-1 to 400-N. Here, in executing each of the programs described above, the processor 901 may read the programs in the memory 902 and execute the programs, or may execute the programs without reading the programs into the memory 902. The memory 902 and the storage 903 also play a role of storing information and data held by the components included in the transmission terminal 100, the reception terminal 200, and the terminals 400-1 to 400-N.

In addition, the above-described program includes a command group (or software code) for causing a computer to perform one or more functions described in the above-described example embodiments when read by the computer. The program may be stored in a non-transitory computer-readable medium or a tangible storage medium. As an example and not by way of limitation, a computer-readable medium or tangible storage medium includes a random-access memory (RAM), a read-only memory (ROM), a flash memory, a solid-state drive (SSD) or other memory technology, a compact disc (CD)-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer-readable medium or a communication medium. As an example and not by way of limitation, the transitory computer-readable medium or communication medium include electrical, optical, acoustic, or other forms of propagation signals.

The input/output interface 904 is connected to a display device 9041, an input device 9042, a sound output device 9043, or the like. The display device 9041 is a device that displays a screen corresponding to drawing data processed by the processor 901, such as a liquid crystal display (LCD), a cathode ray tube (CRT) display, or monitor. The input device 9042 is a device that accepts an input of a user's operation, and is, for example, a keyboard, a mouse, a touch sensor, and the like. The display device 9041 and the input device 9042 may be integrated, and may be implemented as a touch panel. The sound output device 9043 is a device that acoustically outputs sound corresponding to acoustic data that has been processed by the processor 901, such as a speaker.

The communication interface 905 transmits or receives data to and from an external device. For example, the communication interface 905 performs communication with an external device via a wired communication line or a wireless communication line.

Although the present disclosure has been described with reference to the example embodiments, the present disclosure is not limited to the example embodiments described above. Various modifications that can be understood by those skilled in the art can be made to the configuration and details of the present disclosure within the scope of the present disclosure. For example, some or all of the above-described example embodiments may be used in combination with each other.

Furthermore, part or the entirety of the example embodiments described above can also be described as described in the following supplementary notes, but is not limited to the following.

(Supplementary Note 1)

A terminal including:

an acquisition unit configured to acquire a reception interval of a plurality of packets received via a communication path; and a specifying unit configured to specify a delay characteristic of a delay occurring in the communication path based on the distribution of the reception intervals.

(Supplementary Note 2)

The terminal according to Supplementary Note 1, further including an identifying unit configured to identify a processing content of delay processing performed on the communication path based on a delay characteristic of a delay occurring in the communication path.

(Supplementary Note 3)

The terminal according to Supplementary Note 2, in which the specifying unit specifies a type and a delay amount of delay processing performed on the communication path as a delay characteristic of a delay occurring in the communication path.

(Supplementary Note 4)

The terminal according to Supplementary Note 3, in which the specifying unit performs clustering to divide a distribution of the reception intervals into a plurality of clusters, specifies a type of delay processing performed on the communication path based on the number of divisions by the clustering, and specifies a delay amount of delay processing performed on the communication path based on a distance between clusters after division by the clustering.

(Supplementary Note 5)

The terminal according to Supplementary Note 4, in which the specifying unit specifies a type and a delay amount of each of a plurality of delay processing performed on the communication path by performing the clustering for a plurality of times.

(Supplementary Note 6)

The terminal according to Supplementary Note 5, further including a calculation unit configured to calculate a state transition probability indicating a transition probability between clusters after division by the clustering performed for a plurality of times, in which the identifying unit identifies a processing content of each of a plurality of delay processing performed on the communication path based on a type and a delay amount of each of the plurality of delay processing performed on the communication path and the state transition probability.

(Supplementary Note 7)

The terminal according to any one of Supplementary Notes 3 to 6, further including a determination unit configured to determine whether or not delay processing has been performed on the communication path based on a mixing number of Laplace distributions in a case where a distribution of probabilities of the reception intervals is expressed by a mixed Laplace distribution obtained by mixing a plurality of Laplace distributions, in which when the determination unit determines that delay processing has been performed on the communication path, the specifying unit estimates a type and a delay amount of delay processing performed on the communication path, and the identifying unit identifies processing contents of the delay processing.

(Supplementary Note 8)

The terminal according to any one of Supplementary Notes 1 to 7, further including a control unit configured to control an application that transmits or receives a packet via at least one of a plurality of the communication paths, in which the specifying unit specifies a delay characteristic of a delay occurring on the communication path for each of the plurality of the communication paths, and the control unit selects the communication path used by the application based on a delay characteristic of each of the plurality of the communication paths.

(Supplementary Note 9)

The terminal according to any one of Supplementary Notes 3 to 7, further including a control unit configured to control an application that transmits or receives a packet via at least one of a plurality of the communication paths, in which the specifying unit estimates a type and a delay amount of delay processing performed on the communication path for each of the plurality of the communication paths, the identifying unit identifies a processing content of delay processing performed on the communication path, for each of the plurality of the communication paths, and the control unit selects the communication path used by the application based on a type and a delay amount of delay processing performed on each of the plurality of the communication paths or based on a processing content of delay processing performed on each of the plurality of the communication paths.

(Supplementary Note 10)

An analysis method including the steps of:

receiving a plurality of packets via a communication path;

acquiring a reception interval of the plurality of received packets; and specifying a delay characteristic of a delay occurring in the communication path based on the distribution of the reception intervals.

(Supplementary Note 11)

The analysis method according to Supplementary Note 10, further including the step of identifying a processing content of a delay processing performed on the communication path based on a delay characteristic of a delay occurring on the communication path.

(Supplementary Note 12)

The analysis method according to Supplementary Note 11, in which the specifying step includes specifying a type and a delay amount of delay processing performed on the communication path as a delay characteristic of a delay occurring in the communication path.

(Supplementary Note 13)

The analysis method according to Supplementary Note 12, in which the specifying step includes performing clustering to divide a distribution of the reception intervals into a plurality of clusters, specifying a type of delay processing performed on the communication path based on the number of divisions by the clustering, and specifying a delay amount of delay processing performed on the communication path based on a distance between clusters after division by the clustering.

(Supplementary Note 14)

The analysis method according to Supplementary Note 13, in which the specifying step includes specifying a type and a delay amount of each of a plurality of delay processing performed on the communication path by performing the clustering for a plurality of times.

(Supplementary Note 15)

The analysis method according to Supplementary Note 14, further including the step of calculating a state transition probability indicating a transition probability between clusters after division by the clustering performed for a plurality of times, in which the identifying step includes identifying a processing content of each of a plurality of delay processing performed on the communication path based on a type and a delay amount of each of the plurality of delay processing performed on the communication path and the state transition probability.

(Supplementary Note 16)

The analysis method according to any one of Supplementary Notes 12 to 15, further including the step of determining whether or not delay processing has been performed on the communication path based on a mixing number of Laplace distributions in a case where a distribution of probabilities of the reception intervals is expressed by a mixed Laplace distribution obtained by mixing a plurality of Laplace distributions, in which when determined that delay processing has been performed on the communication path by the determination step, the specifying step estimates a type and a delay amount of delay processing performed on the communication path, and the identifying step identifies processing contents of the delay processing.

(Supplementary Note 17)

The analysis method according to any one of Supplementary Notes 10 to 16, further including the step of controlling an application that transmits or receives a packet via at least one of a plurality of the communication paths, in which in the specifying step, a delay characteristic of a delay occurring on the communication path is specified for each of the plurality of the communication paths, and in the control step, the communication path used by the application is selected based on a delay characteristic of each of the plurality of the communication paths.

(Supplementary Note 18)

The analysis method according to any one of Supplementary Notes 12 to 16, further including the step of controlling an application that transmits or receives a packet via at least one of a plurality of the communication paths, in which in the specifying step, a type and a delay amount of delay processing performed on the communication path are estimated for each of the plurality of the communication paths, in the identifying step, a processing content of delay processing performed on the communication path is identified for each of the plurality of the communication paths, and in the control step, the communication path used by the application is selected based on a type and a delay amount of delay processing performed on each of the plurality of the communication paths or based on a processing content of delay processing performed on each of the plurality of the communication paths.

(Supplementary Note 19)

An analysis system including:

a receiving means for receiving a plurality of packets via a communication path;

an acquisition means for acquiring a reception interval of the plurality of received packets; and a specifying means for specifying a delay characteristic of a delay occurring in the communication path based on the distribution of the reception intervals.

(Supplementary Note 20)

The analysis system according to Supplementary Note 19, further including an identifying means for identifying a processing content of a delay processing performed on the communication path based on a delay characteristic of a delay occurring on the communication path.

(Supplementary Note 21)

The analysis system according to Supplementary Note 20, in which the specifying means specifies a type and a delay amount of delay processing performed on the communication path as a delay characteristic of a delay occurring in the communication path.

(Supplementary Note 22)

The analysis system according to Supplementary Note 21, in which the specifying means performs clustering to divide a distribution of the reception intervals into a plurality of clusters, specifies a type of delay processing performed on the communication path based on the number of divisions by the clustering, and specifies a delay amount of delay processing performed on the communication path based on a distance between clusters after division by the clustering.

(Supplementary Note 23)

The analysis system according to Supplementary Note 22, in which the specifying means specifies a type and a delay amount of each of a plurality of delay processing performed on the communication path by performing the clustering for a plurality of times.

(Supplementary Note 24)

The analysis system according to Supplementary Note 23, further including a calculation means for calculating a state transition probability indicating a transition probability between clusters after division by the clustering performed for a plurality of times, in which the identifying means identifies a processing content of each of a plurality of delay processing performed on the communication path based on a type and a delay amount of each of the plurality of delay processing performed on the communication path and the state transition probability.

(Supplementary Note 25)

The analysis system according to any one of Supplementary Notes 21 to 24, further including a determination means for determining whether or not delay processing has been performed on the communication path based on a mixing number of Laplace distributions in a case where a distribution of probabilities of the reception intervals is expressed by a mixed Laplace distribution obtained by mixing a plurality of Laplace distributions, in which when the determination means determines that delay processing has been performed on the communication path, the specifying means estimates a type and a delay amount of delay processing performed on the communication path, and the identifying unit identifies processing contents of the delay processing.

(Supplementary Note 26)

The analysis system according to any one of Supplementary Notes 19 to 25, further including a control means for controlling an application that transmits or receives a packet via at least one of a plurality of the communication paths, in which the specifying means specifies a delay characteristic of a delay occurring on the communication path for each of the plurality of the communication paths, and the control means selects the communication path used by the application based on a delay characteristic of each of the plurality of the communication paths.

(Supplementary Note 27)

The analysis system according to any one of Supplementary Notes 21 to 25, further including a control means for controlling an application that transmits or receives a packet via at least one of a plurality of the communication paths, in which the specifying means estimates a type and a delay amount of delay processing performed on the communication path for each of the plurality of the communication paths, the identifying means identifies a processing content of delay processing performed on the communication path, for each of the plurality of the communication paths, and the control means selects the communication path used by the application based on a type and a delay amount of delay processing performed on each of the plurality of the communication paths or based on a processing content of delay processing performed on each of the plurality of the communication paths.

REFERENCE SIGNS LIST

1, 1A to 1E, 1X ANALYSIS SYSTEM
100 TRANSMISSION TERMINAL
101 PACKET TRANSMITTING UNIT
102 ANALYSIS RESULT RECEIVING UNIT
103 DISPLAY UNIT
104 APPLICATION CONTROL UNIT
105 APPLICATION DB
200 RECEPTION TERMINAL
201 PACKET RECEIVING UNIT
202 RECEPTION INTERVAL CALCULATION UNIT
203 CLUSTERING UNIT
204 PROCESSING CONTENT IDENTIFYING UNIT
205 DELAY PROCESSING DB
2051 LEARNING DEVICE
206 RECEPTION INTERVAL DB
207 STATE TRANSITION PROBABILITY CALCULATION UNIT
208 DELAY PROCESSING MIXTURE DETERMINATION UNIT
209 DISPLAY UNIT
210 ANALYSIS RESULT TRANSMITTING UNIT
211 APPLICATION CONTROL UNIT
212 APPLICATION DB
301, 302 MEC SERVER
303 CARRIER COMMUNICATION MANAGEMENT DEVICE
306 AGV
307 EDGE
308 AGGREGATION DEVICE
400-1 to 400-N TERMINAL
401 ACQUISITION UNIT
402 SPECIFYING UNIT
900 COMPUTER
901 PROCESSOR
902 MEMORY
903 STORAGE
904 INPUT/OUTPUT INTERFACE
9041 DISPLAY DEVICE
9042 INPUT DEVICE
9043 SOUND OUTPUT DEVICE
905 COMMUNICATION INTERFACE

What is claimed is:

1. A terminal comprising:

at least one memory storing instructions, and at least one processor configured to execute the instructions to;

acquire a reception interval of a plurality of packets received via a communication path;

specify a delay characteristic of a delay occurring in the communication path based on the distribution of the reception intervals; and identify a processing content of delay processing performed on the communication path based on a delay characteristic of a delay occurring in the communication path.

2. The terminal according to claim 1, wherein the at least one processor is further configured to execute the instructions to specify a type and a delay amount of delay processing performed on the communication path as a delay characteristic of a delay occurring in the communication path.

3. The terminal according to claim 2, wherein the at least one processor is further configured to execute the instructions to perform clustering to divide a distribution of the reception intervals into a plurality of clusters, specify a type of delay processing performed on the communication path based on the number of divisions by the clustering, and specify a delay amount of delay processing performed on the communication path based on a distance between clusters after division by the clustering.

4. The terminal according to claim 3, wherein the at least one processor is further configured to execute the instructions to specify a type and a delay amount of each of a plurality of delay processing performed on the communication path by performing the clustering for a plurality of times.

5. The terminal according to claim 4, wherein the at least one processor is further configured to execute the instructions to calculate a state transition probability indicating a transition probability between clusters after division by the clustering performed for a plurality of times, and identify processing content of each of a plurality of delay processing performed on the communication path based on a type and a delay amount of each of the plurality of delay processing performed on the communication path and the state transition probability.

6. The terminal according to claim 1, wherein the at least one processor is further configured to execute the instructions to control an application that transmits or receives a packet via at least one of a plurality of the communication paths, specify delay characteristic of a delay occurring on the communication path for each of the plurality of the communication paths, and select the communication path used by the application based on a delay characteristic of each of the plurality of the communication paths.

7. An analysis method comprising the steps of:

receiving a plurality of packets via a communication path;

acquiring a reception interval of the plurality of received packets;

specifying a delay characteristic of a delay occurring in the communication path based on the distribution of the reception intervals; and identifying a processing content of a delay processing performed on the communication path based on a delay characteristic of a delay occurring on the communication path.

8. The analysis method according to claim 7, wherein the specifying step includes specifying a type and a delay amount of delay processing performed on the communication path as a delay characteristic of a delay occurring in the communication path.

9. The analysis method according to claim 8, wherein the specifying step includes performing clustering to divide a distribution of the reception intervals into a plurality of clusters, specifying a type of delay processing performed on the communication path based on the number of divisions by the clustering, and specifying a delay amount of delay processing performed on the communication path based on a distance between clusters after division by the clustering.

10. The analysis method according to claim 9, wherein the specifying step includes specifying a type and a delay amount of each of a plurality of delay processing performed on the communication path by performing the clustering for a plurality of times.

11. The analysis method according to claim 10, further comprising the step of calculating a state transition probability indicating a transition probability between clusters after division by the clustering performed for a plurality of times, wherein the identifying step includes identifying a processing content of each of a plurality of delay processing performed on the communication path based on a type and a delay amount of each of the plurality of delay processing performed on the communication path and the state transition probability.

12. The analysis method according to claim 7, further comprising the step of controlling an application that transmits or receives a packet via at least one of a plurality of the communication paths, wherein in the specifying step, a delay characteristic of a delay occurring on the communication path is specified for each of the plurality of the communication paths, and in the control step, the communication path used by the application is selected based on a delay characteristic of each of the plurality of the communication paths.

13. An analysis system comprising:

a receiving unit configured to receive plurality of packets via a communication path;

an acquisition unit configured to acquire reception interval of the plurality of received packets; and a specifying unit configured to specify delay characteristic of a delay occurring in the communication path based on the distribution of the reception intervals, and an identifying unit configured to identify processing content of a delay processing performed on the communication path based on a delay characteristic of a delay occurring on the communication path.

14. The analysis system according to claim 13, wherein the specifying unit specifies a type and a delay amount of delay processing performed on the communication path as a delay characteristic of a delay occurring in the communication path.

15. The analysis system according to claim 14, wherein the specifying unit performs clustering to divide a distribution of the reception intervals into a plurality of clusters, specifies a type of delay processing performed on the communication path based on the number of divisions by the clustering, and specifies a delay amount of delay processing performed on the communication path based on a distance between clusters after division by the clustering.

16. The analysis system according to claim 15, where the specifying unit specifies a type and a delay amount of each of a plurality of delay processing performed on the communication path by performing the clustering for a plurality of times.

17. The analysis system according to claim 16, further comprising a calculation unit configured to calculate state transition probability indicating a transition probability between clusters after division by the clustering performed for a plurality of times, wherein the identifying unit identifies a processing content of each of a plurality of delay processing performed on the communication path based on a type and a delay amount of each of the plurality of delay processing performed on the communication path and the state transition probability.

* * * * *